(12) United States Patent
S et al.

(10) Patent No.: US 12,147,519 B2
(45) Date of Patent: Nov. 19, 2024

(54) USER AUTHENTICATION BASED ON THREE-DIMENSIONAL FACE MODELING USING PARTIAL FACE IMAGES

(71) Applicant: QUALCOMM Incorporated, San Diego, CA (US)

(72) Inventors: Anupama S, Chennai (IN); Chiranjib Choudhuri, Bangalore (IN); Avani Rao, Bangalore (IN); Ajit Deepak Gupte, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 203 days.

(21) Appl. No.: 17/932,897

(22) Filed: Sep. 16, 2022

(65) Prior Publication Data

US 2024/0104180 A1    Mar. 28, 2024

(51) Int. Cl.
*G06F 21/32*   (2013.01)
*G06V 10/44*   (2022.01)
*G06V 10/74*   (2022.01)
*G06V 10/82*   (2022.01)
*G06V 20/64*   (2022.01)
*G06V 40/16*   (2022.01)

(52) U.S. Cl.
CPC .............. *G06F 21/32* (2013.01); *G06V 10/82* (2022.01); *G06V 40/171* (2022.01)

(58) Field of Classification Search
CPC ....... G06F 21/32; G06V 40/171; G06V 10/82
USPC .......................................................... 726/5
See application file for complete search history.

(56) References Cited

U.S. PATENT DOCUMENTS

| | | | |
|---|---|---|---|
| 8,755,837 B2 * | 6/2014 | Rhoads | G06V 10/56 382/312 |
| 10,529,113 B1 | 1/2020 | Sheikh et al. | |
| 2011/0007174 A1 * | 1/2011 | Bacivarov | G06T 7/40 348/222.1 |
| 2018/0158240 A1 * | 6/2018 | Saito | G06V 40/164 |
| 2019/0318151 A1 * | 10/2019 | Shichijo | G06V 10/761 |
| 2019/0318152 A1 * | 10/2019 | Aoi | G06V 30/144 |

(Continued)

OTHER PUBLICATIONS

Daming Li,; 3D Reconstruction of Face Image Authentication Technology in Electronic Transaction Authentication; IEEE; Year:2000; pp. 11909-11918.*

(Continued)

*Primary Examiner* — Monjur Rahim
(74) *Attorney, Agent, or Firm* — Polsinelli/Qualcomm

(57) ABSTRACT

Systems and techniques are provided for performing user authentication. For example, a process can include obtaining a plurality of images associated with a face and a facial expression of the user, wherein each respective image of the plurality of images includes a different portion of the face. An encoder neural network can be used to generate one or more predicted three-dimensional (3D) facial modeling parameters, wherein the encoder neural network generates the one or more predicted 3D facial modeling parameters based on the plurality of images. A reference 3D facial model associated with the face and the facial expression can be obtained. An error can be determined between the one or more predicted 3D facial modeling parameters and the reference 3D facial model, and the user can be authenticated user based on the error being less than a pre-determined authentication threshold.

30 Claims, 13 Drawing Sheets

(56) References Cited

U.S. PATENT DOCUMENTS

| | | | |
|---|---|---|---|
| 2020/0074153 A1 | 3/2020 | Yang | |
| 2021/0012558 A1* | 1/2021 | Li | G06T 17/00 |
| 2021/0209851 A1* | 7/2021 | Xu | G06T 7/74 |
| 2021/0280322 A1* | 9/2021 | Frank | G16H 50/20 |
| 2021/0286977 A1* | 9/2021 | Chen | G06N 3/045 |
| 2021/0390767 A1* | 12/2021 | Johnson | G06V 40/176 |
| 2022/0066456 A1* | 3/2022 | Ebrahimi Afrouzi | G06F 3/04883 |
| 2022/0225050 A1* | 7/2022 | Ninan | G06F 3/011 |
| 2024/0029291 A1* | 1/2024 | Ogino | G06T 7/00 |

OTHER PUBLICATIONS

Chai X., et al., "Expression-aware Face Reconstruction via a Dual-stream Network", IEEE Transactions on Multimedia, USA, vol. 23, Mar. 31, 2021, pp. 2998-3012, XP011879522, ISSN: 1520-9210, DOI: 10.1109/ICME46284.2020.9102811.

Erdogmus N., et al., "3D Assisted Face Recognition: Dealing with Expression Variations", IEEE Transactions on Information Forensics and Security, USA, vol. 9, No. 5, May 1, 2014, pp. 826-838, XP011545297, ISSN: 1556-6013, DOI: 10.1109/TIFS.2014.2309851.

International Search Report and Written Opinion—PCT/US2023/071145—ISA/EPO—Sep. 29, 2023.

Liu F., et al., "Multi-Dim: A Multi-Dimensional Face Database Towards the Application of 3D Technology in Real-world Scenarios", 2017 IEEE International Joint Conference on Biometrics, Oct. 1, 2017, pp. 342-351, XP033308632.

* cited by examiner

350

USER AUTHENTICATION BASED ON THREE-DIMENSIONAL FACE MODELING USING PARTIAL FACE IMAGES

FIELD

The present disclosure generally relates to systems and techniques for generating three-dimensional (3D) models. For example, aspects of the present disclosure relate to user authentication based on three-dimensional face modeling using partial face images.

BACKGROUND

Many devices and systems allow a scene to be captured by generating frames (also referred to as images) and/or video data (including multiple images or frames) of the scene. For example, a camera or a computing device including a camera (e.g., a mobile device such as a mobile telephone or smartphone including one or more cameras) can capture a sequence of frames of a scene. The frames and/or video data can be captured and processed by such devices and systems (e.g., mobile devices, IP cameras, etc.) and can be output for consumption (e.g., displayed on the device and/or other device). In some cases, the frame and/or video data can be captured by such devices and systems and output for processing and/or consumption by other devices.

A frame can be processed (e.g., using object detection, recognition, segmentation, etc.) to determine objects that are present in the frame, which can be useful for many applications. For instance, a model can be determined for representing an object in a frame and can be used to facilitate effective operation of various systems. Examples of such applications and systems include computer graphics, extended reality (e.g., augmented reality, virtual reality, and the like), image recognition (e.g., face recognition, object recognition, scene recognition, etc.), and feature estimation, among others.

BRIEF SUMMARY

Disclosed are systems, apparatuses, methods, and computer-readable media for generating one or more models (e.g., one or more 3D facial models). According to at least one example, a method is provided for generating a 3D facial model. The method includes: obtaining a plurality of images associated with a face and a facial expression of the user, wherein each respective image of the plurality of images includes a different portion of the face; generating, using an encoder neural network, one or more predicted three-dimensional (3D) facial modeling parameters, wherein the encoder neural network generates the one or more predicted 3D facial modeling parameters based on the plurality of images; obtaining a reference 3D facial model associated with the face and the facial expression; determining an error between the one or more predicted 3D facial modeling parameters and the reference 3D facial model; and authenticating the user based on the error being less than a pre-determined authentication threshold.

In another example, an apparatus is provided that includes at least one memory (e.g., configured to store data) and at least one processor (e.g., implemented in circuitry) coupled to the at least one memory. The at least one processor is configured to and can: obtain a plurality of images associated with a face and a facial expression of the user, wherein each respective image of the plurality of images includes a different portion of the face; generate, using an encoder neural network, one or more predicted three-dimensional (3D) facial modeling parameters, wherein the encoder neural network generates the one or more predicted 3D facial modeling parameters based on the plurality of images; obtain a reference 3D facial model associated with the face and the facial expression; determine an error between the one or more predicted 3D facial modeling parameters and the reference 3D facial model; and authenticate the user based on the error being less than a pre-determined authentication threshold.

In another example, a non-transitory computer-readable medium is provided that has stored thereon instructions that, when executed by one or more processors, cause the one or more processors to: obtain a plurality of images associated with a face and a facial expression of the user, wherein each respective image of the plurality of images includes a different portion of the face; generate, using an encoder neural network, one or more predicted three-dimensional (3D) facial modeling parameters, wherein the encoder neural network generates the one or more predicted 3D facial modeling parameters based on the plurality of images; obtain a reference 3D facial model associated with the face and the facial expression; determine an error between the one or more predicted 3D facial modeling parameters and the reference 3D facial model; and authenticate the user based on the error being less than a pre-determined authentication threshold.

In another example, an apparatus is provided that includes: means for obtaining a plurality of images associated with a face and a facial expression of the user, wherein each respective image of the plurality of images includes a different portion of the face; means for generating, using an encoder neural network, one or more predicted three-dimensional (3D) facial modeling parameters, wherein the encoder neural network generates the one or more predicted 3D facial modeling parameters based on the plurality of images; means for obtaining a reference 3D facial model associated with the face and the facial expression; means for determining an error between the one or more predicted 3D facial modeling parameters and the reference 3D facial model; and means for authenticating the user based on the error being less than a pre-determined authentication threshold.

In some aspects, one or more of the apparatuses described above is or is part of a camera, a mobile device (e.g., a mobile telephone or so-called "smart phone" or other mobile device), a vehicle or computing system or device of a vehicle, a wearable device, an extended reality device (e.g., a virtual reality (VR) device, an augmented reality (AR) device, or a mixed reality (MR) device), a personal computer, a laptop computer, a server computer, or other device. In some aspects, an apparatus includes a camera or multiple cameras for capturing one or more images. In some aspects, the apparatus further includes a display for displaying one or more images, notifications, and/or other displayable data. In some aspects, the apparatus can include one or more sensors, which can be used for determining a location and/or pose of the apparatus, a state of the apparatuses, and/or for other purposes.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following drawing figures.

DETAILED DESCRIPTION

Figure 1:
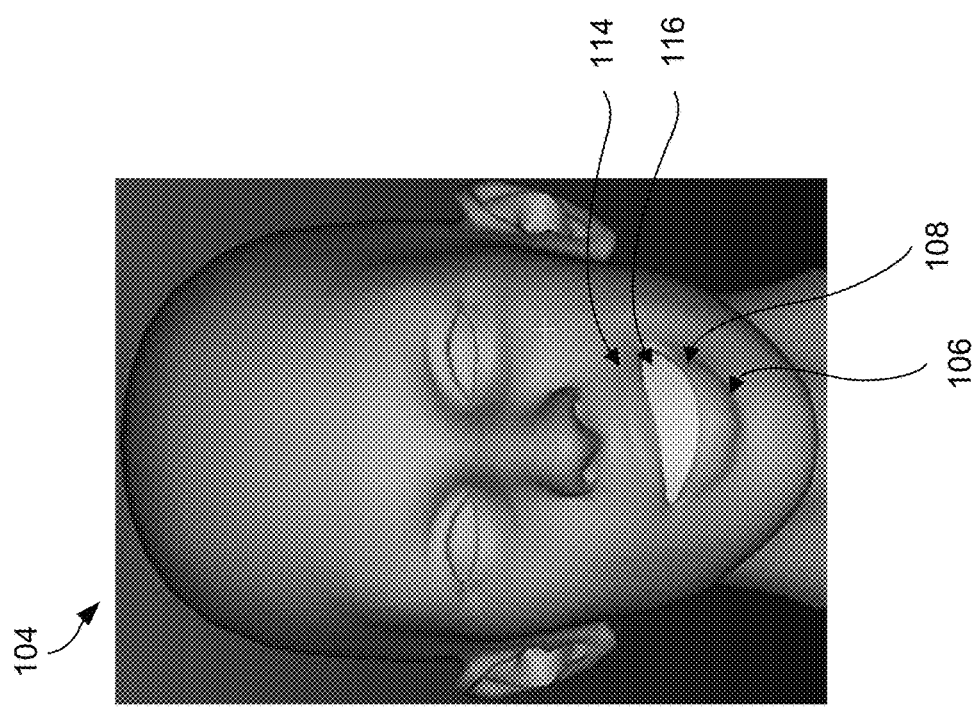
FIG. 1 illustrates an example three-dimensional (3D) facial model and corresponding two-dimensional (2D) facial images overlaid with landmarks projected from the 3D facial model, in accordance with some examples.
Figure 1:
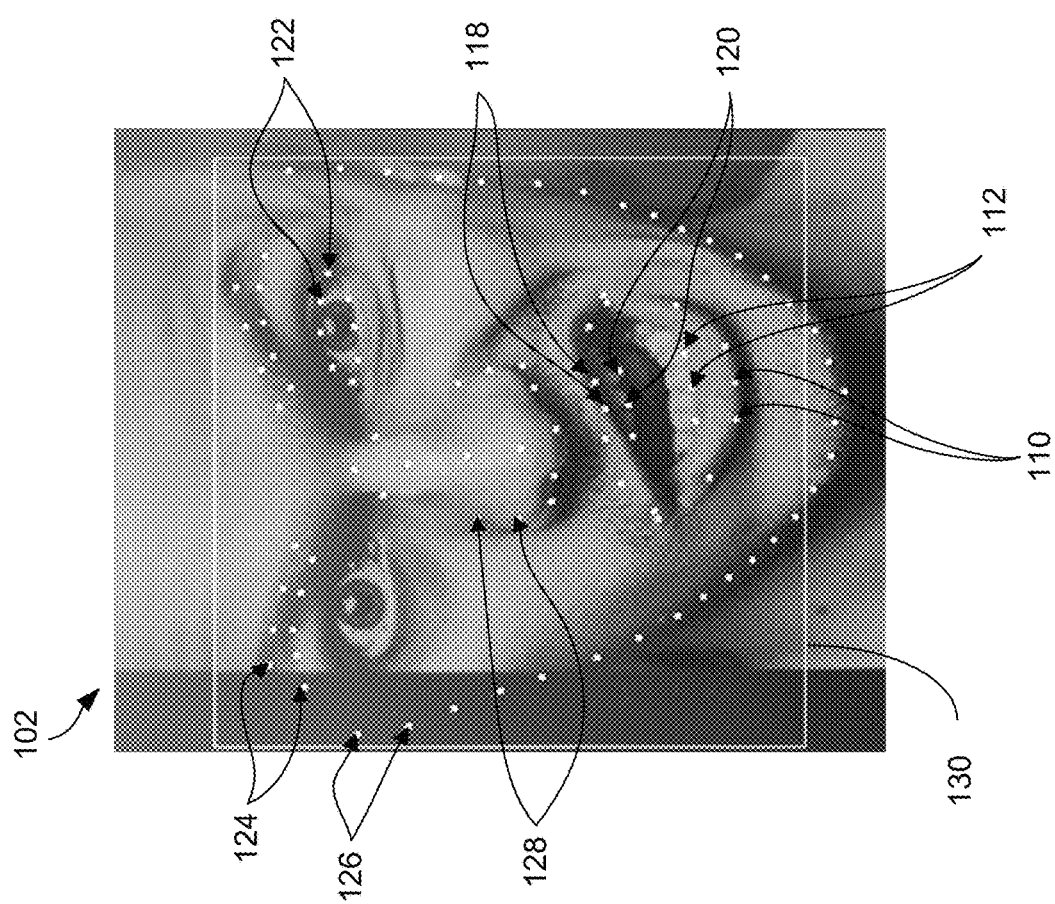

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The generation of three-dimensional (3D) models for physical objects can be useful for many systems and applications, such as for extended reality (XR) (e.g., including augmented reality (AR), virtual reality (VR), mixed reality (MR), etc.), robotics, automotive, aviation, 3D scene understanding, object grasping, object tracking, in addition to many other systems and applications. In AR environments, for example, a user may view images (also referred to as frames) that include an integration of artificial or virtual graphics with the user's natural surroundings. AR applications allow real images to be processed to add virtual objects to the images or to display virtual objects on a see-through display (so that the virtual objects appear to be overlaid over the real-world environment). AR applications can align or register the virtual objects to real-world objects (e.g., as observed in the images) in multiple dimensions. For instance, a real-world object that exists in reality can be represented using a model that resembles or is an exact match of the real-world object. In one example, a model of a virtual vehicle representing a vehicle on a road may be presented by the display of an AR device (e.g., AR glasses, AR head-mounted display (HMD), or other device) while the user continues to view his or her natural surroundings through the display. The viewer may be able to manipulate the model while viewing the real-world scene. In another example, an actual object sitting on a table may be identified and rendered with a model that has a different color or different physical attributes in the AR environment. In some cases, artificial virtual objects that do not exist in reality or computer-generated copies of actual objects or structures of the user's natural surroundings can also be added to the AR environment.

There is an increasing number of applications that use face data (e.g., for XR systems, for 3D graphics, for security, among others), leading to a large demand for systems with the ability to generate detailed 3D face models (as well as 3D models of other objects) in an efficient and high-quality manner. Generating a detailed 3D model of an object (e.g., a 3D face model) typically requires expensive equipment and multiple cameras in an environment with controlled lighting, which hinders large-scale data collection.

For example, face data and/or 3D face models can be used to identify and/or authenticate a user of a VR, XR, and/or AR system. In some cases, face data associated with the user can be captured (e.g., using one or more cameras associated with the XR system, one or more HMDs associated with the XR system, etc.) and used to identify and/or authenticate the user.

Object identification and object authentication (also referred to as object verification) present two related problems and have subtle differences. Object identification can be defined as a one-to-multiple problem in some cases. For example, face identification (as an example of object identification) can be used to find a person from multiple persons. Face identification has many applications, such as for performing a criminal search. Object authentication can be defined as a one-to-one problem. For example, face authentication (as an example of object authentication) can be used to check if a person is who they claim to be (e.g., to check if the person claimed is the person in an enrolled database of authorized users). Face authentication has many applications, such as for performing access control to a device, system, place, or other accessible item.

Using face identification as an illustrative example of object identification, an enrolled database containing the features of enrolled faces can be used for comparison with the features of one or more given query face images (e.g., from input images or frames). The enrolled faces can include faces registered with the system and stored in the enrolled database, which contains known faces. An enrolled face that is the most similar to a query face image can be determined to be a match with the query face image. Each enrolled face can be associated with a person identifier that identifies the person to whom the face belongs. The person identifier of the matched enrolled face (the most similar face) is identified as the person to be recognized.

As noted above, object authentication or verification systems can be used to authenticate or verify objects. For example, using face authentication as an example, an input query face image can be compared with stored or enrolled representations of a person's face. In general, face authentication needs higher recognition accuracy since it is often related to access control of a device or system. A false positive is not expected in this case. Face authentication should be able to recognize the person who the face belongs to with high accuracy but with low rejection rate. Rejection rate is the percentage of faces that are not recognized due to a matching score or classification result being below a threshold for recognition.

Biometrics is the science of analyzing physical or behavioral characteristics specific to each individual, in order to be able to authenticate the identity of each individual. Biometric-based authentication methods can be used to authenticate people, such as to provide access to devices, systems, places, or other accessible items. In some cases, biometric-based authentication allows a person to be authenticated based on a set of templates (verifiable data), which are unique to the person. Examples of biometric-based authentication include face authentication, fingerprint authentication, voice authentication, among others. Face authentication, for example, can compare a face of a device user in an input image with known features (e.g., stored in one or more templates) of the person the user claims to be, in order to authenticate that the user of the device is, in fact, the person. A similar process can be performed for fingerprint authentication, voice authentication, and other biometric-based authentication methods.

Biometric-based user authentication systems typically have at least two steps, including an enrollment step and an authentication step (or test step). The enrollment step captures biometric data and stores representations of the biometric data as a template. The template can then be used in the authentication step. For example, the authentication step can determine the similarity of the template against a representation of input biometric data and can use the similarity to determine whether to authenticate the user.

As mentioned previously, face data and/or 3D face models can be used to identify and/or authenticate a user of a VR, XR, and/or AR system. For example, user identification and/or authentication can be performed based on face data or images captured using one or more cameras or HMDs associated with an XR system to which the user is being identified or authenticated.

Performing 3D object reconstruction (e.g., to generate a 3D model of an object, such as a face model) from one or more images can be challenging. Using a face as an illustrative example of a 3D object, 3D face reconstruction can be difficult based on the need to reconstruct the face geometry (e.g., shape) and the facial expression. In some cases, when representing a 3D face model, the 3D face model may be viewed from different angles. For example, a 3D face model in an XR environment may be viewed at different angles by a user moving within the environment. In another example, the 3D facial model may move (e.g., change pose) relative to a fixed viewing position. In some cases, maintaining an accurate projection of the 3D face model onto a 2D image over a range of view angles (also referred to herein as views) can be challenging.

In addition, it can be difficult to accurately reconstruct facial expressions for portions of the face that can experience high variations in appearance. In one illustrative example, the eyes of a face can be moved to extreme gaze directions (e.g., looking for to one side, crossing eyes, or the like). In another illustrative example, the upper and lower lips of the mouth of a face are controlled by muscles that allow a large variety of difficult to reconstruct mouth shapes (e.g., smiling, frowning, baring teeth, twisting lips, etc.).

As illustrated in FIG. 1, white dots overlaid on a 2D facial image 102 can represent a projection of 3D vertices of a 3D facial model 104 back onto the original 2D facial image 102 used to generate the 3D facial model 104. For instance, in the illustration of FIG. 1, points corresponding to 3D vertices of major features of the 3D facial model (which can be referred to as landmarks or 2D landmarks) are depicted as white dots. As shown, landmarks 110, 112, 118, 120, 122, 124, 126, 128 are included for the outlines of lips, nose, mouth, eyes, eyebrows, nose, among others. Although the 3D facial model 104 may contain a much larger number of vertices, for purposes of illustration, only a small number of projected 3D vertices corresponding to the above listed facial features are shown. In the illustrated example of FIG. 1, landmarks corresponding to the inner contour 108 of the lower lip of the 3D facial model 104 projected onto a 2D image can include landmarks 112. Similarly, the landmarks corresponding to the outer contour 106 of the lower lip of the 3D facial model 104 can include landmarks 110.

FIG. 1 also illustrates the outer contour 114 and inner contour 116 of the upper lip of the 3D facial model 104. In some examples, landmarks corresponding to the outer contour 114 of the upper lip can include landmarks 118 and 124 and landmarks corresponding to the inner contour 116 of the upper lip can include landmarks 120. Additional landmarks projected from the 3D facial model 104 can include landmarks 122 corresponding to the left eye, landmarks 124 corresponding to the right eyebrow, landmarks 126 corresponding to the overall face outline, and landmarks 128 corresponding to the nose. As noted above, each of the landmarks 114, 116, 120, 122, 124, 126, and 128 can result from a projection of the 3D facial model 104 onto the 2D facial image 102.

FIG. 1 illustrates a two-dimensional (2D) facial image 102 and a corresponding 3D facial model 104 generated from the 2D facial image 102 using a 3D morphable model (3DMM). In some aspects, the 3D facial model 104 can include a representation of a facial expression in the 2D facial image 102. In one illustrative example, the facial expression representation can be formed from blendshapes. Blendshapes can semantically represent movement of muscles or portions of facial features (e.g., opening/closing of the jaw, raising/lowering of an eyebrow, opening/closing eyes, etc.). In some cases, each blendshape can be represented by a blendshape coefficient paired with a corresponding blendshape vector.

In some examples, the 3D facial model 104 can include a representation of the facial shape in the 2D facial image 102. In some cases, the facial shape can be repsresented by a facial shape coefficient paired with a corresponding facial shape vector. In some implementations a 3D model engine (e.g., a machine learning model) can be trained (e.g., during a training process) to enforce a consistent faical shape (e.g., consistent facial shape coefficients) for a 3D facial model regardless of a pose (e.g., pitch, yaw, and roll) associated with the 3D facial model. For example, when the 3D facial model is rendered into a 2D image for display, the 3D facial model can be projected onto a 2D image using a projection technique. While a 3D model engine that enforces a consistent facial shape independent of pose, the projected 2D image may have varying degrees of accuracy based on the pose of the 3D facial model captured in the projected 2D image.

In some cases, it can be difficult to accurately reconstruct a 3D face model (e.g., including a face model shape and/or a face model expression) based on one or more obstructions between the user's face and a camera or imaging device that is used to capture images for reconstructing a 3D face model of the user. For example, when a 3D face model is reconstructed from images captured using an HMD (e.g., worn by a user of an XR system), unobstructed frontal view images of the user may not be available. In some aspects, an HMD can include one or more inward-facing cameras that can capture images of the user's face (e.g., or portions thereof) when the HMD is worn by the user. For example, the HMD 202 illustrated in FIG. 2 can include one or more inward-facing cameras that can be used to capture one or more images of the user's face (e.g., also referred to as "face images" or "facial images"). In some cases, some (or all) of the face images captured by an HMD worn by a user may be obstructed or otherwise include only a portion of the user's face in the captured face image. For example, the HMD 202 illustrated in FIG. 2 may capture the partial face images 204A, 204B, 204C using a respective three inward-facing cameras. Partial face images may also be referred to as "obstructed face images" or "occluded face images."

In some aspects, unobstructed frontal view images of a user's face may be unavailable based on the size and/or proximity of the HMD relative to a user's face. For example, the size and/or proximity of HMD 202 can result in inward-facing cameras included in HMD 202 capturing the partial face images 204A-C, in which a portion of the user's face is obstructed or occluded in each of the partial face images 204A-C. In some cases, when a 3D face model of a user is reconstructed using partial face images (e.g., such as the partial face images captured by inward-facing cameras of an HMD), it can be difficult to accurately capture or determine the distinguishing facial features that can be used to authenticate a user.

Figure 2:
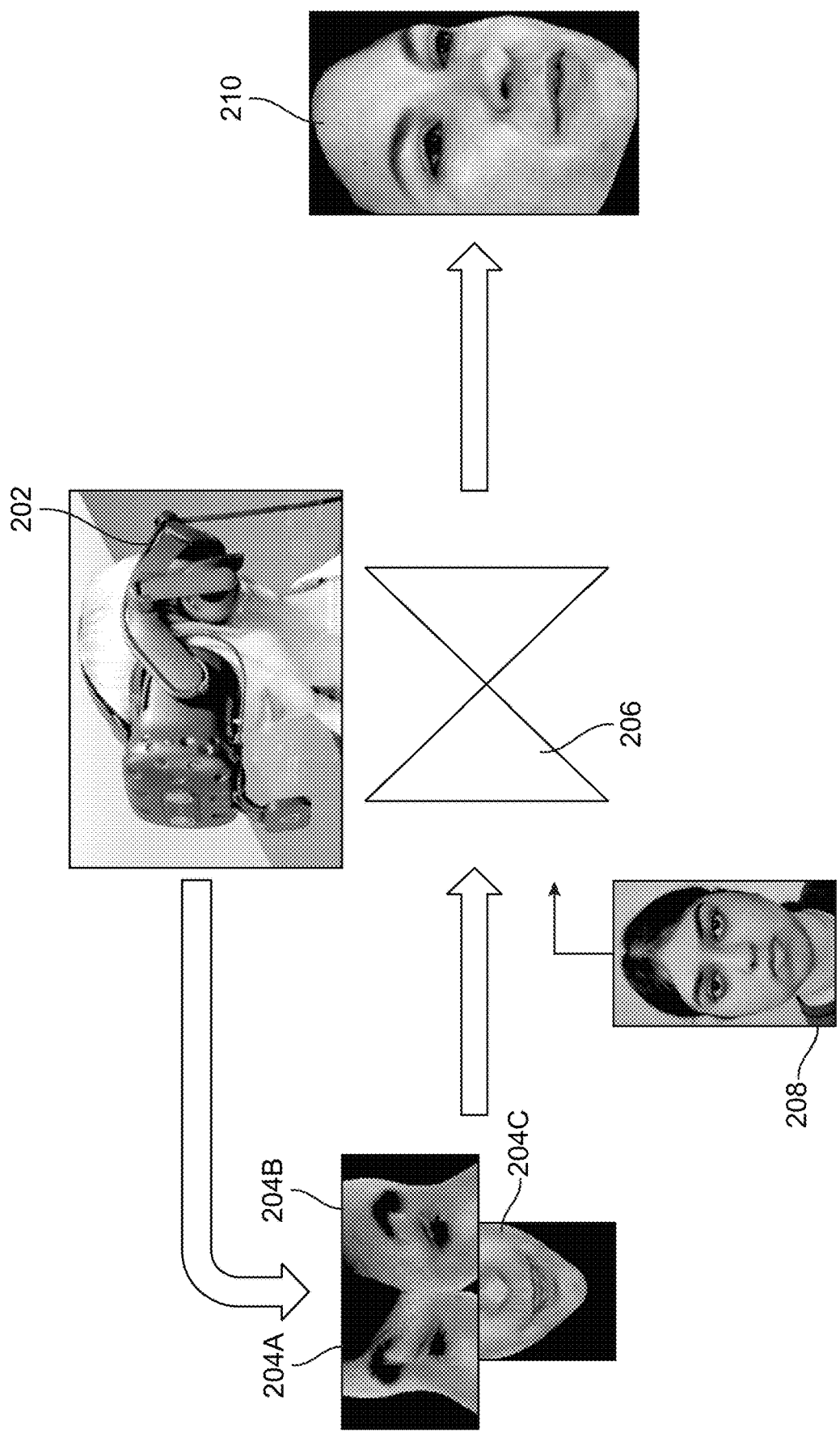
FIG. 2 illustrates an example head mounted extended reality (XR) system with user facing cameras for generating a 3D facial model, in accordance with some examples.

As shown in FIG. 2, a 3D model generator can utilize input frames such as oblique frames 204A, 204B, 204C, and/or 208 to generate the 3D facial model 210. As shown in FIG. 2, the 3D model fitting engine 206 can also generate and/or apply a texture to the underlying 3D model (e.g., the 3D facial model 104 of FIG. 1) to provide a digital representation of the user wearing the head mounted XR system 202. In one illustrative example, a 3D morphable model (3DMM) can be used to represent the geometry of the user's head.

Figure 3A:
FIG. 3A illustrates example partial facial images, in accordance with some examples.
Figure 3A:
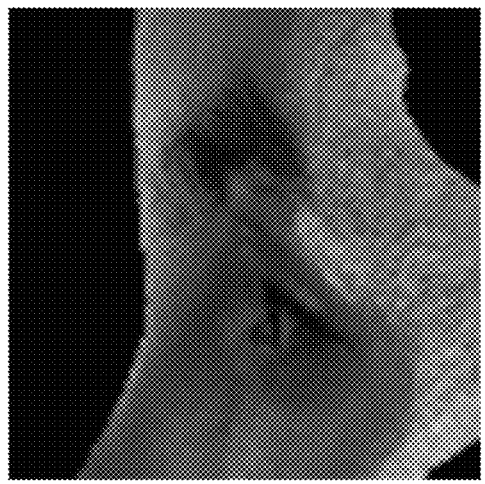
Figure 3A:
Figure 3A:
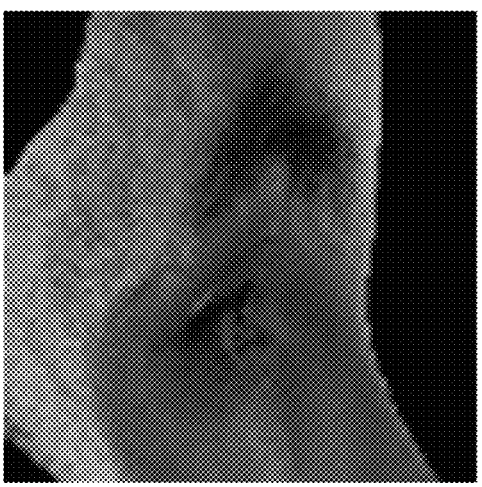
Figure 3A:
Figure 3A:
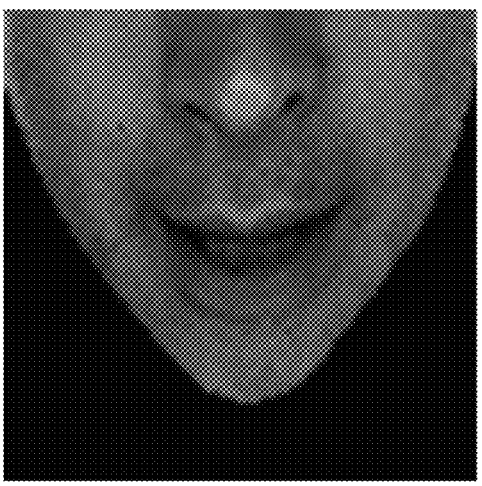

FIG. 3A provides one illustrative example of partial facial images 302, 304, and 306 that can correspond to input images provided to a 3D model generator for generating a reconstructed 3D model (e.g., 3DMM) of a user's face. In some aspects, the partial facial images 302, 304, 306 can be obtained from head mounted cameras. For example, the partial facial images 302, 304, 306 can be obtained from inward-looking cameras included in an HMD worn by a user (e.g., worn by a user of an XR system, etc.). In some examples, the head mounted cameras can capture side views of the left eye (e.g., facial image 302) and the right eye (e.g., facial image 304) and an oblique view of the mouth nose, and jaw of an individual (e.g., facial image 306). In some cases, the head mounted cameras can be included in a head mounted device. In one illustrative example, the head mounted device can include an XR system. In some cases, it may be desired to create a 3D facial model (e.g., 3DMM) of the individual captured in the partial facial images 302, 304, 306. In some cases, the 3D facial model of the individual may be used to generate 2D images of the individual that provide an accurate representation of the user as the pose of the individual's head changes.

In some cases, a resulting 3D facial model (e.g., 3D facial model 210 illustrated in FIG. 2) that is generated or reconstructed based on partial facial images of a user (e.g., such as partial facial images 204A, 204B, 204C and/or partial facial images 302, 304, 306) can produce unrealistic results in the eye and mouth regions. In some cases, a 3DMM may lack capability to accurately reproduce the inner mouth and eyeballs of the user, based on a degree or amount of obstruction or occlusion in the partial facial images used to generate or reconstruct the 3DMM. Unrealistic or inaccurate results in the eye and mouth regions of a 3D face model (e.g., 3DMM) reconstructed using face images of a user can make it difficult to accurately and/or reliably perform authentication of the user based on the reconstructed 3D face model.

Figure 3B:
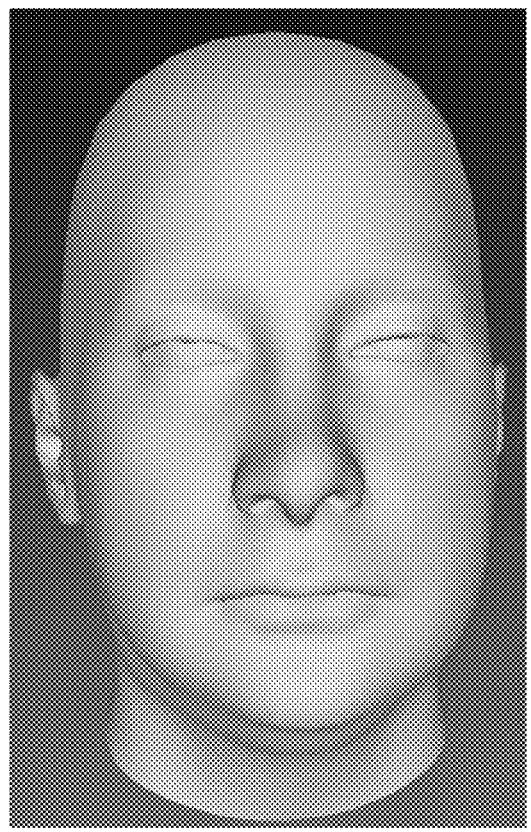
FIG. 3B illustrates an example of a detailed 3D dimensional facial model, in accordance with some examples.

FIG. 3B illustrates a 3D facial model 350 that can be generated with a high level of accuracy to be a true reflection of the shape of an individual's face. A highly detailed 3D facial model such as the one shown in FIG. 3B can be generated using expensive camera equipment that captures an individual's face from multiple angles (e.g., captures one or more unobstructed views or angles of the individual's face). In some cases, the 3D facial model 350 can also be manually edited by skilled artists to product an accurate depiction of an individual. The process of generating such a highly detailed 3D facial model results in only a single model for the specific individual and does not provide a flexible framework for generating 3D models for any individual without advanced preparation of the detailed 3D facial model.

Systems and techniques are needed for generating accurate 3D facial models for a wide variety of facial shapes and facial expressions, such that the accurate 3D facial models can be used to perform user authentication without requiring highly detailed 3D facial models specifically tailored to an individual to generate accurate representations of facial features. There is also a need for systems and techniques that can be used to generate accurate 3D facial models, for a wide variety of facial shapes and facial expressions, using as input one or more partial images of a user's face (e.g., partial and/or occluded images captured by user-facing cameras included in an HMD worn by the user).

Systems, apparatuses, processes (or methods), and computer-readable media (collectively referred to as "systems and techniques") are described herein for using one or more neural network encoders to generate accurate 3D facial models based on one or more input images that are include only a portion of a user's face. For example, the one or more input images can be captured by a respective one or more user-facing cameras included in an HMD worn by the user. HMD images can include, but are not limited to, partial images of a user's eye(s), partial images of a user's mouth or chin, etc. In some cases, the one or more input images can include input images that are partial images (e.g., include a portion of the user's face but not the whole user's face) and are oblique images (e.g., are captured at an angle with respect to the user's face or otherwise do not portray a frontal view of the captured portion of the user's face).

In some examples, one or more neural networks (e.g., encoder neural networks) can be trained to determine, estimate, or predict shape and expression information based on receiving as input one or more partial images of the user's face. For example, an encoder neural network can be trained to generate a plurality of three-dimensional (3D) face modeling parameters based on receiving as input a partial image of the user's eyes (e.g., an image of the left eye and an image of the right eye) and/or a partial image of the user's mouth. In some aspects, the encoder neural network is trained to generate 3D Morphable Model (3DMM) parameters or coefficients that can be used to reconstruct or generate a predicted 3D face model of the user, based on the input images. For example, the encoder neural network can generate a plurality of 3DMM shape coefficients that encode information indicative of an identity of the user (e.g., the shape of the user's face) and/or can generate a plurality of 3DMM expression coefficients that encode information indicative of an expression performed by the user's face.

In some aspects, one or more neural networks (e.g., encoder neural networks) can be trained to determine, estimate, or predict camera pose information associated with the camera(s) used to capture the input partial images of the user's face. For example, camera pose information associated with an HMD that includes user facing cameras can be predicted by the trained encoder neural network (e.g., a pose prediction network). In some examples, the camera pose information can include 6 Degree-of-Freedom (6-DOF) pose information associated with one or more user-facing cameras included in the HMD. The predicted pose information can be associated with the user's face shape and one or more expressions performed by the user (e.g., an expression performed by the user at the time the partial face images used as input were captured or obtained).

While faces are used herein as illustrative examples of objects that can be modeled, the systems and techniques described herein can be applied to generate models for any type of objects. Furthermore, eyes and mouth are used herein as illustrative examples of local feature regions for illustrative purposes. However, one of ordinary skill will appreciate that the systems and techniques described herein can be performed for other local portions of a face. In one illustrative example, similar systems and techniques can be applied to the eyebrows, nose, ears, or any other portion of the face. Similar techniques utilizing local feature generation can also be used with other times of objects in addition to faces.

Figure 4:
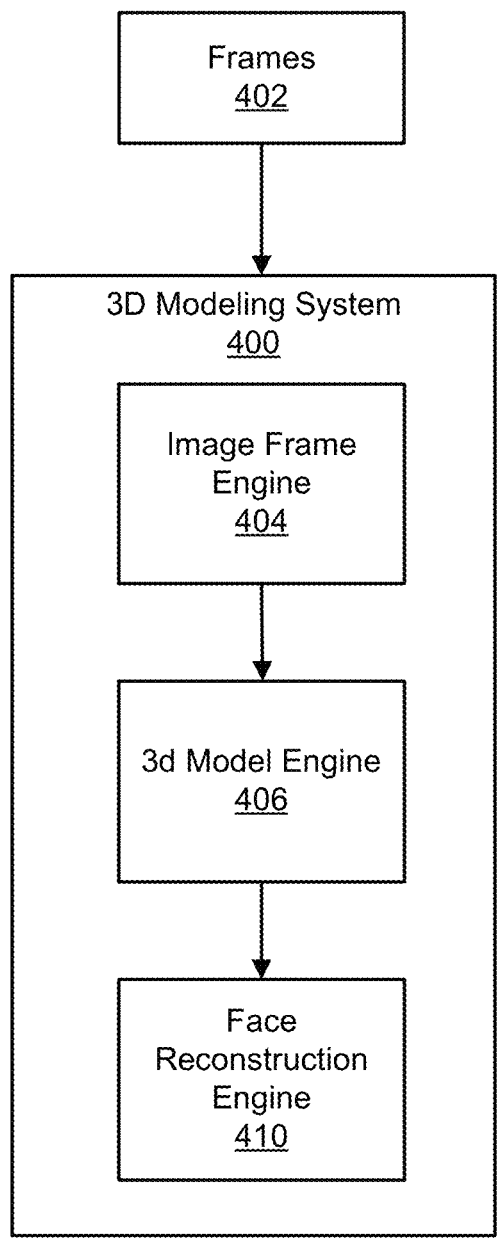
FIG. 4 is a diagram illustrating an example of a 3D modeling system, in accordance with some examples.

Various aspects of the techniques described herein will be discussed below with respect to the figures. FIG. 4 is a diagram illustrating an example of a 3D modeling system 400 that can generate a 3D model (e.g., a 3D morphable model (3DMM)) using at least one image frame 402 (e.g., frames from a user facing camera of the head mounted XR system 202 of FIG. 2). In some examples, the one or more image frames 402 can include partial facial images obtained using one or more inward-looking cameras included in an HMD (e.g., such as the partial facial images 204A, 204B, 204C illustrated in FIG. 2 and/or the partial facial images 302, 304, 306 illustrated in FIG. 3A). As shown in FIG. 4, the 3D modeling system 400 includes an image frame engine 404, a 3D model engine 406, and a face reconstruction engine 410. While the 3D modeling system 400 is shown to include certain components, one of ordinary skill will appreciate that the 3D modeling system 400 can include more components than those shown in FIG. 4. The components of the 3D modeling system 400 can include software, hardware, or one or more combinations of software and hardware. For example, in some implementations, the components of the 3D modeling system 400 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the 3D modeling system 400.

The image frame engine 404 can obtain or receive an image frame 402 captured by an image sensor, from storage, from memory, from an external source (e.g., a server, an external memory accessed via a network, or other external source), or the like. In some cases, the image frame can be included in a sequence of frames (e.g., a video, a sequence of standalone or still images, etc.). In one illustrative example, each frame of the sequence of frames can include a grayscale component per pixel. Other examples of frames include frames having red (R), green (G), and blue (B) components per pixel (referred to as an RGB video including RGB frames), luma, chroma-blue, chroma-red (YUV, YCbCr, or Y'CbCr) components per pixel and/or any other suitable type of image. The sequence of frames can be captured by one or more cameras, obtained from storage, received from another device (e.g., a camera or device including a camera), or obtained from another source. In some implementations, the image frame engine 404 can convert the image frame 402 to or from a grayscale representation or grayscale color domain. The image frame engine 404 can, in some cases, crop a portion of the image frame 402 that corresponds to a face. In some examples, the image frame engine 404 can perform a face detection process and/or face recognition process to detect and/or recognize a face within the image frame 402. The image frame engine 404 can generate or apply a bounding box (e.g., bounding box 130 shown in FIG. 1) around the face and can crop out the image data within the bounding box to generate an input image for the 3D model fitting engine 406.

The 3D model fitting engine 406 can receive an input image (e.g., the image frame 402, the cropped bounding box around the face in the image frame 402, etc.) from the image frame engine 404. Using the input image, the 3D model fitting engine 406 can perform a 3D model fitting technique to generate a 3D model (e.g., a 3DMM model) of the face (which can include the head of the person in the image frame 402). The 3D model fitting technique can include solving for shape coefficients $a_i$ and expression coefficients $b_j$ that can be used to generate a 3DMM representing the face in the input image(s) 402.

In some examples, the 3D model fitting performed by 3D model engine 406 can include or be based on pose information related to a pose of the head. For example, the pose information may indicate an angular rotation of the head with respect to a neutral position of the head. The rotation may be along a first axis (e.g., a yaw axis), a second axis (e.g., a pitch axis), and/or a third axis (e.g., a roll axis). The 3D model generated by the 3D model engine 406 can have differing shape and/or feature coefficients based on the specific view or pose information provided as input.

In some cases, the 3D model fitting can also include a focal length for projection of the 3D model onto a 2D image using any suitable projection technique. In some examples, a weak perspective model can use the focal length produced by the 3D model engine 406 to project the 3D vertices of the 3D model (e.g., the 3DMM) onto a 2D image. In some examples, a full perspective model can use the focal length produced by the 3D model engine 406 to project the 3D vertices of the 3D model (e.g., the 3DMM) onto a 2D image.

In another illustrative example, a full perspective model can be used to project the 3D model onto an image plane. For example, a full perspective projection can be provided by replacing the average depth $Z_{ave}$ in Equation 3 with the actual depth Z for each 3D vertex of the posed 3D model Sp. The weak perspective model and full perspective model techniques for projecting a 3D model onto an image plane, and any suitable projection technique can be used without departing from the scope of the present disclosure.

The face reconstruction engine 410 can receive the coefficients (and any other output parameters such as pose, focal length, etc.) generated by the 3D model engine 406 to generate the 3D model (e.g., the 3DMM). The 3D model can be generated or constructed as a linear combination of a mean face (sometimes referred to as a neutral face), facial shape basis vectors, and facial expression basis vectors. The mean face can represent an average face that can be transformed (e.g., by the shape basis vectors and expression basis vectors) to achieve the desired final 3D face shape of the 3D model. The facial shape basis vectors can be used to scale proportions of the mean face. In some cases, the facial shape basis vectors may be used to represent a fat or thin face, a small or large nose, and any adjustment to the basic facial shape. In some implementations, the facial shape basis vectors are determined based on principal component analysis (PCA). In some cases, the facial expression basis vectors can represent facial expressions, such as smiling, lifting an eyebrow, blinking, winking, frowning, etc.

A 3D model S generated by the 3D model engine 406 using a 3D model fitting technique (e.g., a 3DMM generated using a 3DMM fitting technique) can be a statistical model representing 3D geometry of an object (e.g., a face). For instance, a 3D model (e.g., a 3DMM) can be represented by a linear combination of a mean face $S_0$ with basis terms (also referred to as basis vectors) for facial shape $U_i$ and facial expressions $V_j$ with coefficients for facial shape $a_i$ and facial expressions $b_j$, for example, as follows:

$$S=S_0+\Sigma_{i=1}^{M} a_i \cdot U_i+\Sigma_{j=1}^{N} b_j \cdot V_j \qquad (1)$$

In the example of Equation (1), there are M facial shape coefficients $a_i$ and M facial shape basis vectors $U_i$ where M is an integer greater than or equal to 1. In some implementations, each of the mean face $S_0$, facial shape basis vectors $U_i$, and facial expression vectors $V_j$ can include position information for 3D vertices (e.g., x, y, and z coordinates) that can be combined to form the 3D model S. In some implementations, facial shape basis vectors $U_i$, and facial expression vectors $V_j$ can be expressed as positional offsets from the mean face $S_0$, where the coefficients for facial shape $a_i$ and facial expressions $b_j$ provide a scaling factor for corresponding offset vectors.

One illustrative example of facial expression basis vectors are blendshapes. As used herein, a blendshape can correspond to an approximate semantic parametrization of all or a portion of a facial expression. For example, a blendshape can correspond to a complete facial expression, or correspond to a "partial" (e.g., "delta") facial expression. Examples of partial expressions include raising one eyebrow, closing one eye, moving one side of the face, etc. In one example, an individual blendshape can approximate a linearized effect of the movement of an individual facial muscle. In some cases, the semantic representation can be modeled to correspond with movements of one or more facial muscles.

In one illustrative example, the 3D model S includes three thousand 3D vertices. In one illustrative example, M is equal to 319, which corresponds to 319 facial shape basis vectors $U_i$ and facial shape coefficients $a_i$. In some implementations, the shape basis vectors $U_i$ can include principal component analysis eigenvectors. In some cases, there are N facial expression coefficients $b_j$ and N facial expression basis vectors where N is an integer greater than or equal to 1. In some cases, the facial expression vectors $V_j$ can include blendshape vectors. In one illustrative example, N is equal to 39, which corresponds to 39 facial expression basis vectors $V_j$ and 39 facial expression coefficients $b_j$ (e.g., 39 blendshapes and 39 blendshape coefficients). In some cases, the result of the linear combination shown in Equation (1) can be a 3D model (e.g., a 3DMM) of a face in a neutral pose. In some examples, the 3D model can be rotated with pose information such as yaw, pitch, and roll values to match the pose of the face in the image frame 402.

Face reconstruction engine 410 can receive the pose information from the 3D model engine 406 to generate a 3D model (e.g., a 3DMM) and a projection of the 3D model into a 2D image space. The 3D model S (a facial model) can be generated according to Equation (1) above. As noted above, the 3D model S results in a facial model with a neutral pose. In some cases, the 3D model S can be rotated to create a posed 3D model $S_P$ according to Equation (2) below:

$$S_P=R(\alpha,\beta,\gamma)S \qquad (2)$$

where $R(\alpha,\beta,\gamma)$ is a 3×3 rotation matrix with $\alpha,\beta,\gamma$ rotation angles.

In some cases, the 3D model can be projected onto an image plane using any suitable projection technique. In one illustrative example, a weak perspective projection can be used to project the 3D model onto an image plane. Equation (3) below provides an example of how a weak perspective projection technique can be used to project X and Y components $$\begin{bmatrix} X \\ Y \end{bmatrix}$$

of each 3D vertex coordinate of the posed 3D model $S_P$ onto x and y coordinates of a 2D image $$\begin{bmatrix} x \\ y \end{bmatrix}$$

according to Equation (3) below:

$$\begin{bmatrix} x \\ y \end{bmatrix} = \frac{f}{z_{ave}} \begin{bmatrix} X + t_x \\ Y + t_y \end{bmatrix} \qquad (3)$$

where f is the predicted focal length output by the 3D model engine 406, $Z_{ave}$ is the average depth (or distance) of the face from a weak perspective camera. The projection of Equation (3) can be performed for each 3D vertex of the posed 3D model $S_P$.

In some cases, the 3D model engine 306 can include a machine learning model (e.g., a deep neural network, such as a convolutional neural network (CNN), general adversarial network, inception network, etc.). The 3D model engine 406 can receive an image frame 402 (and in some cases, an input view) as input. In some cases, the image frame 402 and the view/pose information can be one of a plurality of images and corresponding views in a training dataset. The training dataset can include a large number of images that includes a variety of facial shapes, expressions, and views (e.g., including one or multiple views for each of the faces depicted in the images) in order to train the 3D model engine 406 to generate 3D facial models (e.g., 3DMMs) for a large variety of faces and views. In one illustrative example, a training dataset can include one million images and views, two million images and views, or any other suitably large number of images and views. In some cases, the 3D model engine 406 can be trained with the same training data set through multiple iterations, also known as epochs. In some cases, the training dataset used to train the 3D model engine 406 can include images, views, and labels (e.g., in a supervised training process) indicating the known features in the frames. In some cases, the training dataset can include annotated ground truth 2D landmark information corresponding to the locations of facial features for each image frame 402. In some cases, the 2D landmark information can be calculated from each image frame 402 using a landmark algorithm.

During training, the 3D model engine 406 can utilize one or more loss functions to analyze error in the 3D model parameters (e.g., coefficients of Equation (1)). A loss function L can be used to determine the amount of error in a 3D model produced by the 3D model engine 406 relative to the ground truth data provided as input to the 3D model engine 406. One example loss function includes a mean squared error (MSE). The MSE is defined as $E_{total}=\Sigma\frac{1}{2}$ (target−output)$^2$, which calculates the sum of one-half times the actual answer (e.g., the ground truth landmark location) minus the predicted (output) answer squared. Another example loss function includes a normalized mean error, where the error between the ground truth landmarks and the landmarks predicted by the 3D model engine 406 can be normalized by the eye distance of the predicted face.

An example 2D vertex loss function is shown in Equation (6) below:

$$L_{2D} = \frac{1}{M_v}\sum_{i=1}^{M_v} w_i \|Proj_v(p_i) - Proj_v(\hat{p}_i)\|_2^2 \quad (6)$$

Here, $Proj_v(p_i)-Proj_v(\hat{p}_i)$ is the difference between the projected 2D landmark location from the ground truth 3D model and the projected 2D landmark location of a corresponding vertex generated by the 3D model engine 406. M (e.g., an integer) is the number of 2D landmarks. As will be described in greater depth below (e.g., with respect to FIGS. 5A-7), v can represent one of multiple partial face images provided as input. For example, v can represent one of three HMD views of a user's face (e.g., eyes or mouth). $M_v$ can be the set of vertices visible from view v.

An example 3D vertex loss function is shown in Equation (7) below:

$$L_{3D} = \frac{1}{N}\sum_{i=1}^{N} w_i \|p_i - \hat{p}_i\|_2^2 \quad (7)$$

Here, $p_i-\hat{p}_i$ is the difference between the 3D vertex location from the ground truth 3D model and the 3D vertex location of a corresponding vertex generated by the 3D model engine 406 and N (an integer) is the number of 3D vertices.

A landmark loss $L_{Landmarks}$ can be a weighted sum of different 2D and/or 3D landmark loss components as shown in Equation (8) below:

$$L_{Landmarks}=\lambda_{3D}L_{3D}+\lambda_{2D}L_{2D} \quad (8)$$

Where $\lambda_{3D}$ and $\lambda_{2D}$ are weighting coefficients for the 3D landmark loss and 2D landmark loss, respectively.

An example regularization loss function is shown in Equation (9) and an example clamp loss function is shown in Equation (10) below:

$$L_{reg}=\Sigma_{j=1}^{258}\alpha_j^2 \quad (9)$$

Here, $\alpha_j$ are shape coefficients. $b_j$ can represent facial expression coefficients. In some examples, a clamp loss can be used to constrain shape coefficients between fixed bounds (e.g., to preserve semantic meaning):

$$L_{clamp}=\Sigma_{j=1}^{219} f_{LB,j}(\beta_{LB,j}-\alpha_j)+f_{UB,j}(\alpha-\beta_{UB,j}) \quad (10)$$

Here, $\beta_{UB,j}$ and $\beta_{LB,j}$ are upper and lower bound values, respectively, for each of the facial expression coefficients $b_j$ generated by the 3D model engine 406.

During inference (e.g., after training is complete), the 3D model engine 406 can output a 3D facial model (e.g., a 3DMM) based on one or more input image frames 402 Because the constraint on shape coefficients $\alpha_i$ (e.g., shape consistency loss $L_{ShapeConsistency}$ of Equation (4)) is omitted from the loss function shown in Equation (5), the resulting output 3D facial model for an individual can have different shape coefficients depending on the view (e.g., the pose) of the generated 3D facial model. However, removing the constraint on shape consistency can result in a 3D facial model that can produce 2D projected images from different poses.

Figure 5A:
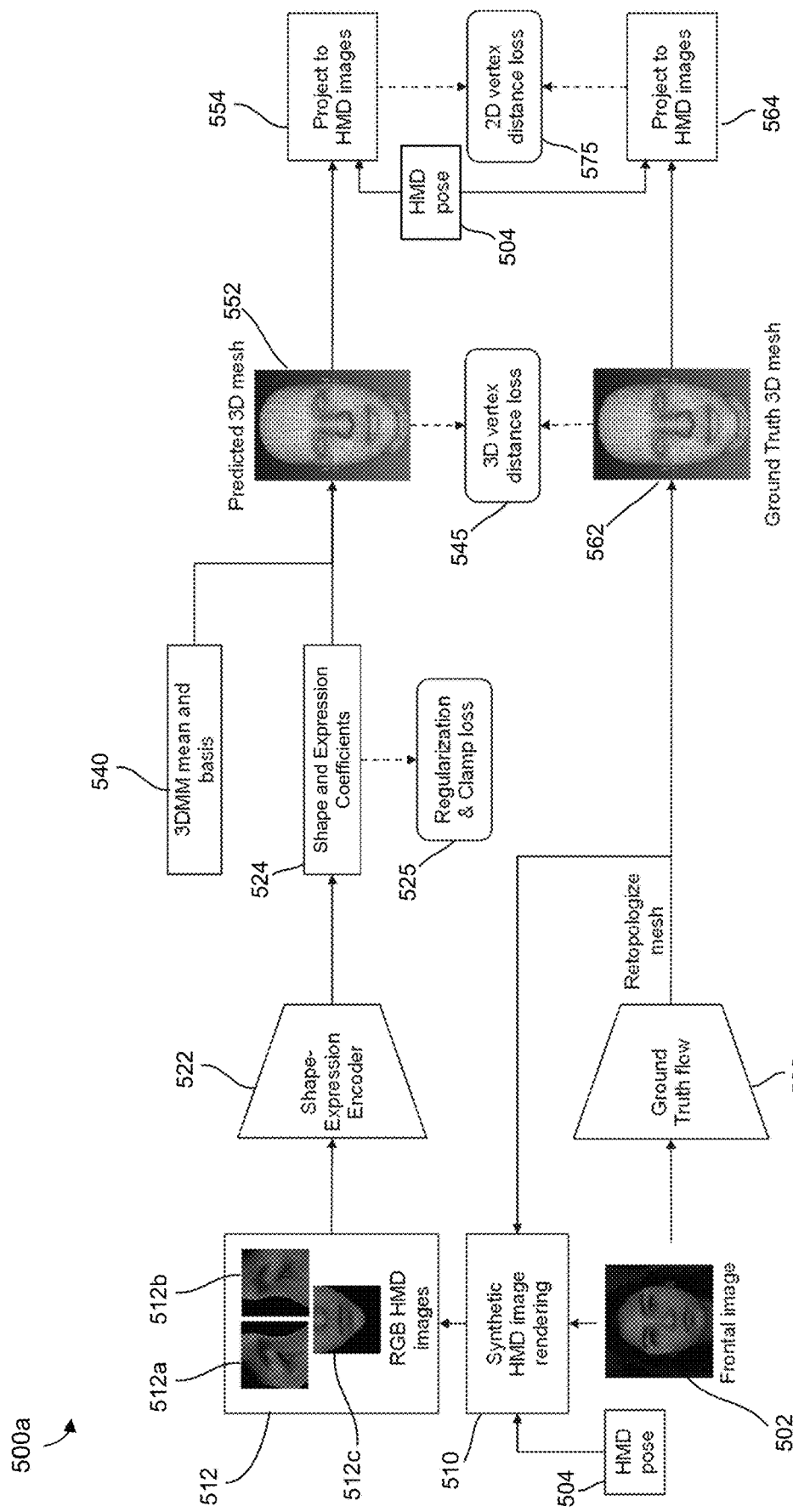
FIG. 5A is a block diagram illustrating an example of training a shape-expression encoder to generate predicted shape and expression coefficients for a 3D facial model, in accordance with some examples.

FIG. 5A illustrates a block diagram of an example training process for training a shape and expression encoder to generate shape coefficients and expression coefficients that can be used to recreate or generate a 3D face model (e.g., 3DMM) of a user's face, based on partial input images of the user's face. In one illustrative example, a shape-expression encoder 522 can be trained to generate shape and expression coefficients 524 based on receiving as input a plurality of HMD images 512. In some aspects, the shape-expression encoder 522 can be a neural network encoder, although various other neural networks, machine learning networks, and/or machine learning algorithms and architectures may also be utilized.

In some aspects, the shape and expression coefficients 524 generated by the trained shape-expression encoder 522 can include a plurality of shape coefficients of a 3D facial model (e.g., a 3DMM) and a plurality of expression coefficients of a 3D facial model (e.g., a 3DMM). For example, the trained shape-expression encoder 522 can be used to generate a plurality of shape coefficients $\alpha_s$ and a plurality of facial expression coefficients $\alpha_e$. In some examples, the trained shape-expression encoder 522 can generate shape and expression coefficients 524 that include up to 210 shape coefficients $\alpha_j$ and up to 30 facial expression coefficients $b_j$.

The shape and expression coefficients 524 can be associated with or used to generate a single 3D facial model 552 that is associated with the plurality of HMD images 512. In some aspects, the 3D facial model 552 generated or reconstructed based on the shape and expression coefficients 524 may also be referred to as a predicted 3D mesh, a predicted 3D face model, and/or a predicted 3D facial model.

For example, the shape and expression coefficients 524 can be used to generate a predicted 3D face model that is a 3D Morphable Mesh (3DMM). A 3DMM predicted 3D face model P can be given by:

$$P = \bar{p} + \alpha_s A_s + \alpha_e A_e \quad (11)$$

Here, $\bar{p}$ represents a mean face (e.g., sometimes referred to as a neutral face); $\alpha_s$ represents up to 219 facial shape coefficients (e.g., which may be determined or predicted by the trained shape-expression encoder 522 and included in the output coefficients 524); $\alpha_e$ represents up to 39 facial expression coefficients (e.g., which may be determined or predicted by the trained shape-expression encoder 522 and included in the output coefficients 524); $A_s$ represents facial shape basis vectors; and $A_e$ represents facial expression basis vectors.

The number of facial shape coefficients $\alpha_s$ can be equal to the number of facial shape basis vectors $A_s$ and the number of facial expression coefficients $\alpha_e$ can be equal to the number of facial expression basis vectors $A_e$. For example, 219 shape coefficients $\alpha_s$ can be applied to 219 facial shape basis vectors $A_s$ and used to deform the mean face of Eq. (11) based on the unique shape of the individual associated with the facial shape coefficients $\alpha_s$. Similarly, 39 facial expression coefficients $\alpha_e$ can be applied to 39 facial expression basis vectors $A_e$ and used to deform the mean face $\bar{p}$ of Eq. (11) based on the expression represented by or associated with the facial expression coefficients $\alpha_e$.

In one illustrative example, the systems and techniques can train shape-expression encoder 522 to estimate (e.g., predict) both shape and expression coefficients using a plurality of partial HMD images as input. For example, the partial HMD images as input can be the same as or similar to the RGB partial HMD images 512 depicted in FIG. 5A. As illustrated, the RGB HMD images 512 can include a plurality of partial HMD images each including a different portion of a user's face. A first HMD image 512a can be an image of a user's right eye, a second HMD image 512b can be an image of the user's left eye, and a third HMD image 512c can be an image of a user's mouth or chin (e.g., mouth or chin area or portion of the user's face).

In some aspects, the HMD training data images 512 (e.g., 512a, 512b, 512c) can be generated based on a ground truth frontal image 502. For example, the ground truth frontal image 502 can be a single, 2D image of an individual, taken from a head-on or frontal perspective. The frontal image 502 can be provided to a synthetic HMD image rendering engine 510, along with HMD pose information 504. Using the HMD pose information 504, the synthetic HMD image rendering engine 510 can generate a plurality of partial HMD images (e.g., such as the partial HMD images 512). The HMD pose information 504 can include one or more HMD pose parameters that will be simulated by synthetic HMD image rendering engine 510 when generating the plurality of partial HMD training data images 512. In some aspects, the HMD pose information 504 can comprise a 6 Degree-of-Freedom (6-DOF) HMD pose information (e.g., up/down, left/right, forward/backward, pitch, roll, yaw).

In some aspects, one or more (or all) of the HMD training data images 512 generated by synthetic HMD image rendering engine 510 can be oblique relative to the ground truth frontal image 502. For example, FIG. 5A illustrates a frontal HMD image 512c that includes the user's mouth, an oblique HMD image 512a that includes the user's right eye, and an oblique HMD image 512b that includes the user's left eye. By generating an HMD training data image 512 that is oblique relative to the ground truth frontal image 502, synthetic HMD image rendering engine 510 can simulate or recreate the perspective of a partial face image that would be captured by a user-facing camera included in an HMD and used to capture face images of the user wearing the HMD.

The ground truth frontal image 502 can be provided to a ground truth flow engine 532 that generates a ground truth 3D mesh 562. The ground truth 3D mesh 562 can be used as the ground truth 3D facial model (e.g., 3DMM) used to train the shape-expression encoder 522 (e.g., based on minimizing a 3D vertex distance loss 545 between the predicted 3D mesh 552 generated based on the shape and expression coefficients 524 predicted by shape-expression encoder 522, and the ground truth 3D mesh 562, as will be described in greater depth below). In some examples, the ground truth flow engine 532 can be a pre-trained neural network or other machine learning network, encoder, etc., that is pre-trained to generate a 3D mesh (e.g., such as the ground truth 3D mesh 562) from a frontal face image (e.g., such as ground truth frontal image 502).

In some cases, the ground truth frontal image data 502 can comprise a single image, as described above. In some examples, the ground truth frontal image data 502 can be captured or obtained using multiple cameras. For example, the ground truth frontal image data 502 may include depth information determined using multiple cameras. In examples in which ground truth frontal image data 502 is multi-camera data, ground truth flow engine 532 can be provided as a pre-trained neural network, machine learning network, encoder, etc. that is pre-trained to generate a 3D mesh (e.g., such as the ground truth 3D mesh 562) from multi-camera frontal image data. In some aspects, ground truth flow engine can be provided using various other mesh generators.

In one illustrative example, the ground truth 3D mesh 562 generated by ground truth flow engine 532 can be used to retopologize a mesh associated with synthetic HMD image rendering engine 510. For example, synthetic HMD image rendering engine 510 can receive as input the ground truth frontal image 502, the ground truth 3D mesh 562 (e.g., which is generated from the ground truth frontal image 502), and HMD pose information 504. Using the HMD pose information 504 and the ground truth 3D mesh 562, synthetic HMD image rendering engine 510 can project the 2D frontal image 502 onto the ground truth 3D mesh 562. The HMD pose information 504 can subsequently be used to backproject the 2D frontal image 502 from the ground truth 3D mesh 562 to the desired 2D HMD image portions 512a-c.

As mentioned previously, shape and expression encoder 522 can generate predicted shape and expression coefficients 524 based on receiving as input the RGB HMD images 512 that were generated from the ground truth frontal image 502. In some aspects, the shape-expression encoder 522 can be trained based at least in part on a regularization and clamp loss 525. For example, the loss 525 can include a regularization loss, $L_{reg}$ given by:

$$L_{reg} = \Sigma_{j=1}^{258} \alpha_j^2 \quad (12)$$

The regularization loss of Eq. (12) can be determined as the sum of the shape and expression coefficients 524 predicted by shape-expression encoder 522 (e.g., Eq. (12) includes a sum from 1 to 258, representing the 219 facial shape coefficients $\alpha_s$ + 39 facial expression coefficients $\alpha_e$ = 258 total coefficients $\alpha_j$).

The loss 525 can additionally include a clamp loss, $L_{clamp}$ given by:

$$L_{clamp} = \Sigma_{j=1}^{219} f_{LB,j}(\beta_{LB,j} - \alpha_j) + f_{UB,j}(\alpha_j - \beta_{UB,j}) \quad (13)$$

The clamp loss of Eq. (13) can be used to constrain the 219 facial shape coefficients $\alpha_s$ (e.g., based on the clamp loss being determined as a sum over $j=1, \ldots, 219$) to be between fixed bounds in order to preserve semantic meaning. For example, the facial shape coefficients $\alpha_s$ (e.g., represented as $\alpha_j$ in Eq. (13) can be constrained to be between an upper bound $\beta_{UB,j}$ and a lower bound $\beta_{LB,j}$. The upper and lower bounds can preserve semantic meaning for the facial shape coefficients that may be predicted by shape-expression encoder 522, as facial shape coefficients that have a value that is too high or too low may represent deformations of the mean face $\bar{p}$ that are unrealistic and should not be permitted as output. In some cases, the upper and lower bounds of the clamp loss of Eq. (13) can prevent overfitting and preserve the semantic meaning captured by the facial shape coefficients (e.g., the semantic meaning being the unique deformations of the mean face $\bar{p}$ that can be applied to recreate a unique 3D face model of the user).

Returning to the example training process depicted in FIG. 5A for training the shape-expression encoder 522, as illustrated, the shape and expression coefficients 524 can be used to generate a predicted 3D mesh 552. In one illustrative example, the predicted 3D mesh 552 can be a 3DMM generated using Eq. (11). For example, the predicted 3D mesh 552 can be generated by using the coefficient values for $\alpha_s$ and $\alpha_e$ included in the shape and expression coefficients prediction 524 output by shape-expression encoder 522 during a given training iteration as inputs to Eq. (11). The systems and techniques can additionally use a 3DMM mean and basis 540 (e.g., in combination with the shape and expression coefficients prediction 524) to generate the predicted 3D mesh 552. For example, the 3DMM mean and basis information 540 can include a mean face $\bar{p}$ (e.g., wherein the same mean face is used to generate both the ground truth 3D mesh 562 and the predicted 3D mesh 552), a plurality of facial shape basis vectors $A_s$, and a plurality of facial expression basis vectors $A_e$. In some aspects, the same mean face, facial shape basis vectors, and facial expression vectors can be used to generate the predicted 3D mesh 552 and the ground truth 3D mesh 562. In some cases, the same mean face, facial shape basis vectors, and facial expression vectors can be used across all of the training iterations performed to train shape-expression encoder 522. In some examples, the mean face $\bar{p}$ included in the 3DMM mean and basis information 540 can be a universal (e.g., person-independent) mean and basis.

The predicted 3D mesh 552 is a 3D facial model (e.g., 3DMM) that is generated using the shape and expression coefficients 524 that were predicted by shape-expression encoder 522 using only the partial HMD images 512 as input. In some aspects, the shape-expression encoder 522 can encode person-specific details into the facial shape coefficients $\alpha_s$ and/or the facial expression coefficients and $\alpha_e$ (e.g., which are included in the predicted coefficients output 524 generated by shape-expression encoder 522). For example, the person-specific detail can be encoded in the shape and expression coefficients 524 based at least in part on the fact that the 3DMM mean and basis information 540 is universal, rather than being personalized.

A 3D vertex distance loss 545 can be determined as the error for a given training iteration, as the 3D vertex distance loss 545 can represent the difference(s) between the predicted 3D mesh 552 and the ground truth 3D mesh 562. In one illustrative example, the 3D vertex distance loss 545 can be the same as or similar to the 3D vertex distance loss of Eq. (7). In some aspects, as shape-expression encoder 522 is trained to more accurately predict the shape and expression coefficients 524 for a given set of input HMD training images 512, the resulting predicted 3D mesh 552 will become increasingly similar to the ground truth 3D mesh 562, and the 3D vertex distance loss 545 will decrease.

In one illustrative example, shape-expression encoder 522 can be trained based at least in part on minimizing the regularization and clamp loss 525 and the 3D vertex distance loss 545 over a plurality of training iterations. Each training iteration can utilize a different ground truth frontal image 502 and/or a different set of HMD training data images 512 (e.g., if the same ground truth frontal image 502 is used for multiple training iterations, the synthetic HMD image rendering engine 510 can be configured to generate different HMD images from the same ground truth frontal image 502 for each training iteration).

In some aspects, shape-expression encoder 522 can additionally, or alternatively, be trained based at least in part on a 2D vertex distance loss 575. In one illustrative example, the 2D vertex distance loss 575 can be the same as or similar to the 2D vertex distance loss of Eq. (6). For example, the 2D vertex distance loss 575 can be calculated based on projecting the predicted 3D mesh 552 to the HMD images (e.g., indicated at 554) and projecting the ground truth 3D mesh 562 to the same HMD images (e.g., indicated at 564). In some examples, the projection operations 554 and 564 can be performed using the HMD pose information 504 (e.g., the same HMD pose information 504 that was used to generate the HMD images 512 at synthetic HMD image rendering engine 510). In one illustrative example, shape-expression encoder 522 can be trained based on minimizing the sum of the regularization and clamp loss 525, the 3D vertex distance loss 545, and the 2D vertex distance loss 575 over each training iteration.

In one illustrative example, the shape-expression encoder 522 can be trained using a plurality of training iterations, wherein some (or all) of the training iterations utilize a different ground truth frontal image 502 and/or a different set of partial HMD images 512. For example, the plurality of training iterations can be performed using ground truth frontal images 502 (e.g., and therefore, partial HMD images 512) that depict, represent, or are associated with many different persons, different lighting conditions, different facial appearances, different facial expressions, etc.

Figure 5B:
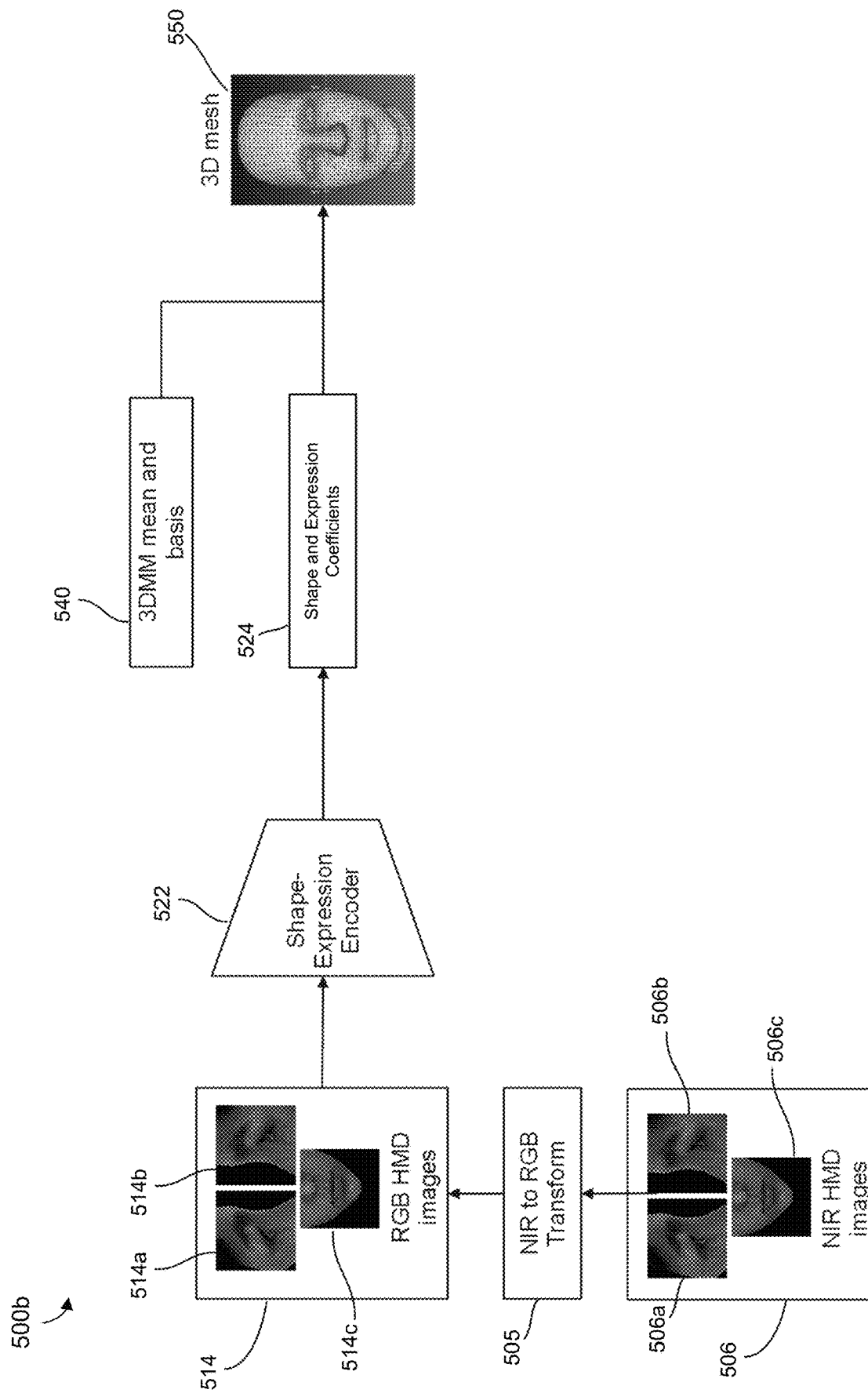
FIG. 5B is a block diagram illustrating an example of inference using a trained shape-expression encoder, in accordance with some examples.

FIG. 5B is a diagram illustrating an example of an inference process 500b that can be performed using the trained shape-expression encoder 522 (e.g., the inference process of FIG. 5B can be performed after completing the training process for shape-expression encoder 522 described above with respect to FIG. 5A). In some aspects, the inference process 500b illustrated in FIG. 5B can be performed by an XR device or system, a VR device or system, an AR device or system, and/or other computing device associated with an HMD worn by a user, etc. As will be described in greater depth below, the XR device or system can perform authentication of the user based on the inference process 500b.

In some examples, user face images captured by an HMD may be infrared (IR) or near-infrared (NIR) images, rather than the synthetic RGB HMD images 512 that were used to train shape-expression encoder 522. For example, user-facing cameras that are included inside of an HMD may be unable to capture RGB face images due to the interior volume of the HMD (e.g., the volume enclosed by the HMD and immediately adjacent to the user's eyes) being a low-light environment. The user-facing cameras included in an HMD may therefore capture IR, NIR, or other partial HMD images that are rendered in a grayscale color domain, or other non-RGB color domain, etc.

As illustrated in FIG. 5B, user authentication can be performed based on obtaining (e.g., from an HMD worn by a user) a plurality of partial HMD images 506 of the user's face. The plurality of partial HMD images 506 can be captured as IR or NIR images. In some cases, the partial HMD images 506 captured inside of the HMD may be IR or NIR images (e.g., such as the left and right eye images 506a, 506b respectively) while the partial HMD images 506 captured outside of the HMD may be RGB images (e.g., such as the mouth image 506c). In some cases, all of the partial HMD images 506 may be IR or NIR images, as is depicted in FIG. 5B.

After obtaining the plurality of partial HMD images 506, an NIR to RGB transform engine 505 can be used to convert the HMD images 506 (e.g., as needed) from the NIR color domain in which the HMD image(s) were captured into the RGB color domain in which the shape-expression encoder 522 was trained. In some aspects, when one or more of the partial HMD images 506 are captured in a color domain that is not the NIR color domain, but is also not the same as the color domain in which the shape-expression encoder 522 was trained, the component depicted in FIG. 5B as NIR to RGB transform engine 505 can be replaced by a suitable transform engine for converting from the color domain in which the partial HMD images 506 are natively captured (e.g., by the user-facing cameras included in the HMD) to the color domain in which the shape-expression encoder 522 was trained (e.g., RGB or otherwise).

The output of NIR to RGB transform engine 505 is a set of RGB HMD images 514 that correspond to the RGB color domain (or other color domain) in which the shape-expression encoder 522 was trained. For example, the NIR HMD left eye image 506a is converted to an RGB HMD left eye image 514a, the NIR HMD right eye image 506b is converted to an RGB HMD right eye image 514b, and the NIR mouth image 506c is converted to an RGB HMD mouth image 514c.

Inference (and subsequent user authentication) can be performed based on providing the RGB HMD images 514 as input to the trained shape-expression encoder 522. The trained shape-expression encoder 522 can generate as output a plurality of shape and expression coefficients 524 that correspond to the input RGB HMD images 514, as was described above with respect to FIG. 5A.

Using the 3DMM mean and basis 540 (e.g., a universal or person-independent 2DMM mean and basis), the predicted shape and expression coefficients 524 can be used to generate a predicted 3D mesh 550 corresponding to the facial data of the user as represented in the RGB HMD images 514 provided as input to the trained shape-expression encoder 522 (e.g., as also described above with respect to FIG. 5A).

In one illustrative example, the predicted 3D mesh 550 can be used to perform user authentication. For example, the user authentication can include an initial enrollment stage, wherein the user is prompted to enroll or register a set of different expressions while wearing the HMD. One or more sets of HMD images (e.g., NIR HMD images 506) are captured for each prompted expression that is being registered/enrolled for the user, and an enrolled 3D mesh (not shown) is generated and saved for the unique combination of the user's face and the prompted expression. The enrolled 3D meshes can be generated using the same process described above with respect to FIG. 5B.

In some aspects, the trained shape-expression encoder 522 can generate shape and expression coefficients 524 that are unique to each user face shape-user facial expression combination that is provided during the enrollment process. In some examples, the enrollment stage can include storing at least the shape and expression coefficients 524 for the user's enrolled face-expression combinations. In some aspects, the enrollment stage can include storing the shape and expression coefficients 524 and the resulting 3D mesh generating using the shape and expression coefficients 524, again for each of the user's enrolled face-expression combinations. In some aspects, only the resulting 3D mesh can be stored and used for subsequent authentication. In some examples, the enrolled expressions associated with a user can include multiple different expressions, such as neutral, smiling, anger, etc. In some cases, a single reference may be stored for some (or all) of the enrolled expressions. In some examples, multiple references may be stored for some (or all) of the enrolled expressions.

In the authentication stage, the user (e.g., while wearing the HMD) can be prompted to perform one or more expressions that have previously been enrolled, as described above. In some examples, the user can be prompted to perform a single expression, multiple ones of the enrolled expressions, or all of the enrolled expressions. Authentication can be performed based on capturing HMD image data (e.g., NIR HMD images 506) of the user performing a prompted expression and using the captured HMD image data to generate shape and expression coefficients 524 (and/or the corresponding 3D mesh 550) for the captured HMD image data.

In one illustrative example, the shape and expression coefficients 524 that are predicted during inference for the captured HMD image data associated with a user performing a requested expression can be compared against the enrolled shape and expression coefficients that were generated (e.g., also be the trained shape-expression encoder 522) during enrollment when the user was prompted to perform the same expression. In some aspects, the shape and expression coefficients 524 that are determined during authentication can be validated against an enrolled target comprising the enrolled shape and expression coefficients that were generated by trained shape-expression encoder 522 during enrollment for the same expression. In some examples, authentication can be based on determining that one or more error values determined between the shape and expression coefficients 524 and the enrolled shape and expression coefficients are below a corresponding one or more pre-determined thresholds.

For example, a weighted absolute error in shape and expression coefficients, $m_1$, can be determined as:

$$m_1 = \frac{1}{258}\sum_{i=1}^{258} w_i|\alpha_i - \hat{\alpha_i}| \qquad (14)$$

A weighted mean vertex error in 3D, $m_2$, can be determined as:

$$m_2 = \frac{1}{N}\sum_{i=1}^{N} w_i\|p_i - \hat{p_i}\|_2 \qquad (15)$$

A weighted mean vertex error in 2D, $m_3$, can be determined as:

$$m_3 = \frac{1}{M}\sum_{i=1}^{M} w_i\|Proj_v(p_i) - Proj_v(\hat{p_i})\|_2 \qquad (16)$$

In some cases, each of the error values of Eqs. (14)-(16) may be associated with a different pre-determined authentication threshold, wherein the user is authenticated if the error value is less than or equal to its respective pre-determined authentication threshold. In some examples, the error values of Eqs. (14)-(16) may be associated with the same pre-determined authentication threshold, wherein the user is authenticated if at least one of the error values is less than or equal to the single pre-determined authentication threshold. In some cases, the user will only be authenticated if multiple ones of the error values of Eqs. (14)-(16), or all three of the error values, are less than or equal to the pre-determined authentication threshold.

Figure 6:
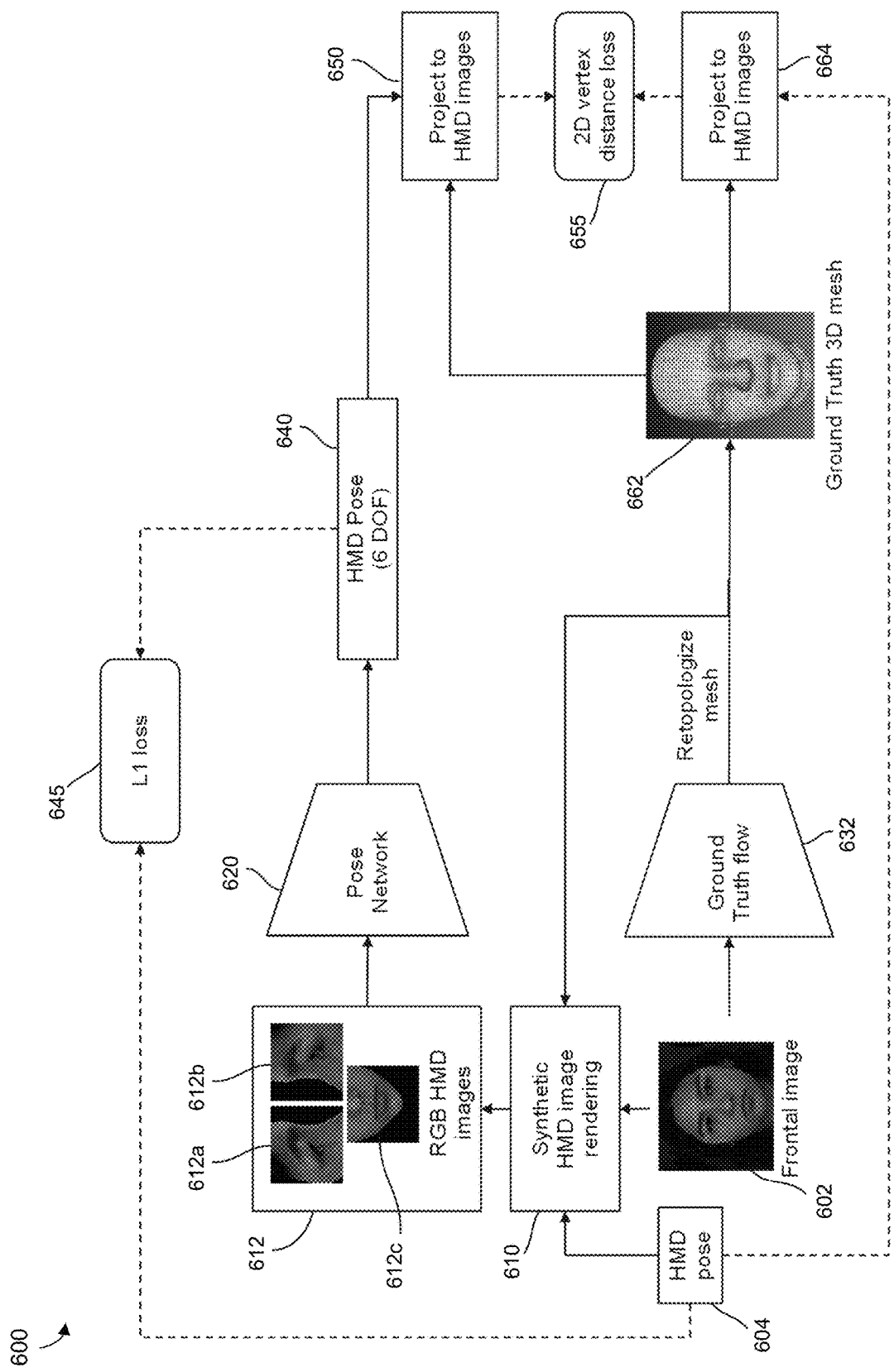
FIG. 6 is a block diagram illustrating an example of training a pose encoder to generate predicted pose information, in accordance with some examples.

In another illustrative example, a neural network (e.g., a neural network encoder) can be trained to estimate an HMD pose from one or more input HMD images (e.g., such as the input HMD images 512, 506, and/or 514 described above with respect to FIGS. 5A and 5B). For example, a neural network encoder can be trained to estimate (e.g., predict) HMD pose information associated with a primary camera of an HMD. FIG. 6 is a diagram illustrating an example training process 600 for training a pose network 620 (e.g., also referred to as a pose encoder, a neural network pose encoder, etc.) to generate a predicted HMD pose 640 based on an input of RGB HMD images 612.

In some aspects, the example training process 600 illustrated in FIG. 6 can be the same as or similar to the example training process 500a illustrated in FIG. 5A, with the shape-expression encoder 522 of FIG. 5A replaced by a pose encoder 620 in FIG. 6. For example, in some aspects, the ground truth frontal image 602 can be the same as or similar to the ground truth frontal image 502 of FIG. 5A; the synthetic HMD image rendering engine 610 can be the same as or similar to the synthetic HMD image rendering engine 510 of FIG. 5A; the ground truth flow engine 632 can be the same as or similar to the ground truth flow engine 532 of FIG. 5A; the ground truth 3D mesh 662 can be the same as or similar to the ground truth 3D mesh 562 of FIG. 5A; and/or the RGB partial HMD images 612 can be the same as or similar to the RGB partial HMD images 512 of FIG. 5A.

Based on receiving as input the plurality of RGB partial HMD images 612, the pose network 620 can be trained to generate HMD pose information 640, wherein the HMD pose information 640 is a predicted HMD pose corresponding to an HMD used to capture one or more of the HMD images 612 and/or is a predicted HMD pose corresponding to at least one user-facing camera included in the HMD and used to capture the HMD images 612. For example, the precited HMD pose information 640 can be a predicted 6-DOF HMD pose associated with a primary camera of the HMD used to capture the HMD images 612.

Pose encoder 620 can be trained based at least in part on an L1 loss 645, which can be calculated or otherwise determined between the predicted HMD pose 640 and a corresponding ground truth HMD pose 604. The ground truth HMD pose 604 can be the same as or similar to the HMD pose 604 of FIG. 5A. As illustrated, the HMD pose 604 can additionally be provided as input to the synthetic HMD image rendering engine 610 (e.g., as also illustrated in FIG. 5A).

The ground truth HMD pose 604 can further be provided as input to the HMD projection operation 664, which can be performed to project the ground truth 3D mesh 662 to the HMD images 612 (e.g., in a manner that is the same as or similar to that described above with respect to the projection operation 564 illustrated in FIG. 5A).

The L1 loss 645 can be indicative of a difference or error between the HMD pose 640 predicted by pose encoder 620 and the ground truth HMD pose 604 that would be predicted by pose encoder 620 if it were error free or trained to be 100% accurate. Based on minimizing the L1 loss 645 during a plurality of training iterations performed for pose network 620, pose encoder 620 can be trained to accurately (or more accurately) generated predicted HMD pose information 640 for a given input of RGB partial HMD images 612.

In some cases, an additional 2D vertex loss 655 can be used to train the pose encoder 620. For example, the 2D vertex loss 655 can be determined the same as or similar to the 2D vertex loss 575 described in FIG. 5A. In the context of training poise encoder 620, the predicted HMD pose 640 for a given training iteration can be combined with the ground truth 3D mesh 662 and used to project the ground truth 3D mesh 662 onto the HMD images 612.

For example, at projection 650, the predicted HMD pose information 640 generated by pose network 620 can be combined with known HMD camera intrinsic information (e.g., relative positions of the HMD user-facing cameras, focal lengths, etc.) and used to generate a projection of the ground truth 3D mesh 662 to the HMD images 612.

A similar projection of the ground truth 3D mesh 662 to the HMD images 612 can be generated at projection 664 by using the ground truth HMD pose information 604 (e.g., along with the same, known HMD camera intrinsic information) to configure and generate a projection of the ground truth 3D mesh 662 to the HMD images 612.

If the predicted HMD pose information 640 and the ground-truth HMD pose information 604 are the same, then the 2D vertex projections 650 and 664 will be the same, and the loss or error between the two projections (e.g., 2D vertex distance loss 655) will be zero. If the predicted HMD pose information 640 and the ground truth HMD pose information 604 are not the same, then the corresponding 2D vertex projections 650 and 664, respectively, will differ and 2D vertex distance loss 655 will have a non-zero value. Based at least in part on minimizing the 2D vertex distance loss 655 between the 2D projection of ground truth 3D mesh 662 using the predicted HMD pose information 640 and the 2D projection of ground truth 3D mesh 662 using the ground truth HMD pose information 604, the pose network 602 can be trained to accurately (or more accurately) generate predicted HMD pose information 640 using as input only the plurality of RGB partial HMD images 612.

In on illustrative example, user authentication can be performed using the trained pose encoder 620 in a manner similar to that described above with respect to FIGS. 5A and 5B, and the trained shape-expression encoder 522. For example, user authentication based on trained pose encoder 620 can include a user enrollment stage that is that same as the user enrollment stage described above with respect to user authentication based on trained shape-expression encoder 522.

An authentication stage using trained pose encoder 620 can be performed by initially prompting a user to perform one or more expressions that were previously enrolled (e.g., the same as described above with respect to the authentication stage using trained shape-expression encoder 522). In response to a user performing a prompted expression, the systems and techniques can capture a plurality of partial HMD images of the user's face while performing the prompted expression. For example, the plurality of partial HJMD images can be the same as the plurality of NIR partial HMD images 506 described above with respect to FIG. 5B. The NIR partial HMD images can be transformed or converted into a plurality of RGB partial HMD images using an NIR to RGB transform engine, in a manner the same as or similar to that described above with respect to the NIR to RGB transform engine 505 of FIG. 5B and the resulting RGB partial HMD images 514.

The trained pose encoder 620 can generate an estimated or predicted HMD pose information 640 (e.g., a predicted 6 DOF HMD pose) based on receiving as input the resulting plurality of RGB partial HMD images. Using the predicted HMD pose information 640 and the known HMD camera intrinsic, the enrolled mesh (e.g., determined during the enrollment stage for the currently authenticated combination of user face and expression) can be projected onto the plurality of RGB partial HMD images. For example, the projection can be performed in the same manner as described above, with the enrolled mesh for the prompted expression replacing the ground truth 3D mesh 662 depicted in the training flow of FIG. 6.

In some cases, projecting the enrolled mesh onto the plurality of RGB partial HMD images can be performed by projecting one or more enrolled mesh landmarks onto the RGB partial HMD images and subsequently using a 2D landmark detector to determine one or more detected landmarks in the RGB partial HMD images. For example, landmarks (e.g., of the enrolled mesh landmarks and the detected landmarks) can comprise facial features and/or expression features such as the corners of the eyes or mouth, etc.)

In one illustrative example, the detected landmarks determined for the partial HMD images being authenticated can be compared against the projected landmarks that were generated by using the predicted HMD pose information 640 to project the enrolled 3D mesh onto the 2D partial HMD images. Because the enrolled 3D meshes are target-user-specific, the enrolled meshes will not align with a different user's landmarks (e.g., when a different user, with a different face shape, performs the same expression, the different user's projected landmarks would be different than the projected landmarks for the user being authenticated).

In some cases, authentication of the user can be performed based on determining that a mean landmark error or difference between the 2D projected landmarks (e.g., generated by using the predicted HMD pose information 640 to project the user-expression enrolled 3D mesh onto the 2D partial HMD images) and the corresponding landmarks included in the partial HMD images captured by the user-facing cameras of the HMD is less than or equal to a pre-determined threshold. For example, the pre-determined threshold can be a mean 2D landmark error, $m_4$, given by:

$$m_4 = \frac{1}{K}\sum_{i=1}^{K} \|l_i) - l_i^-\|_2 \tag{17}$$

Figure 7:
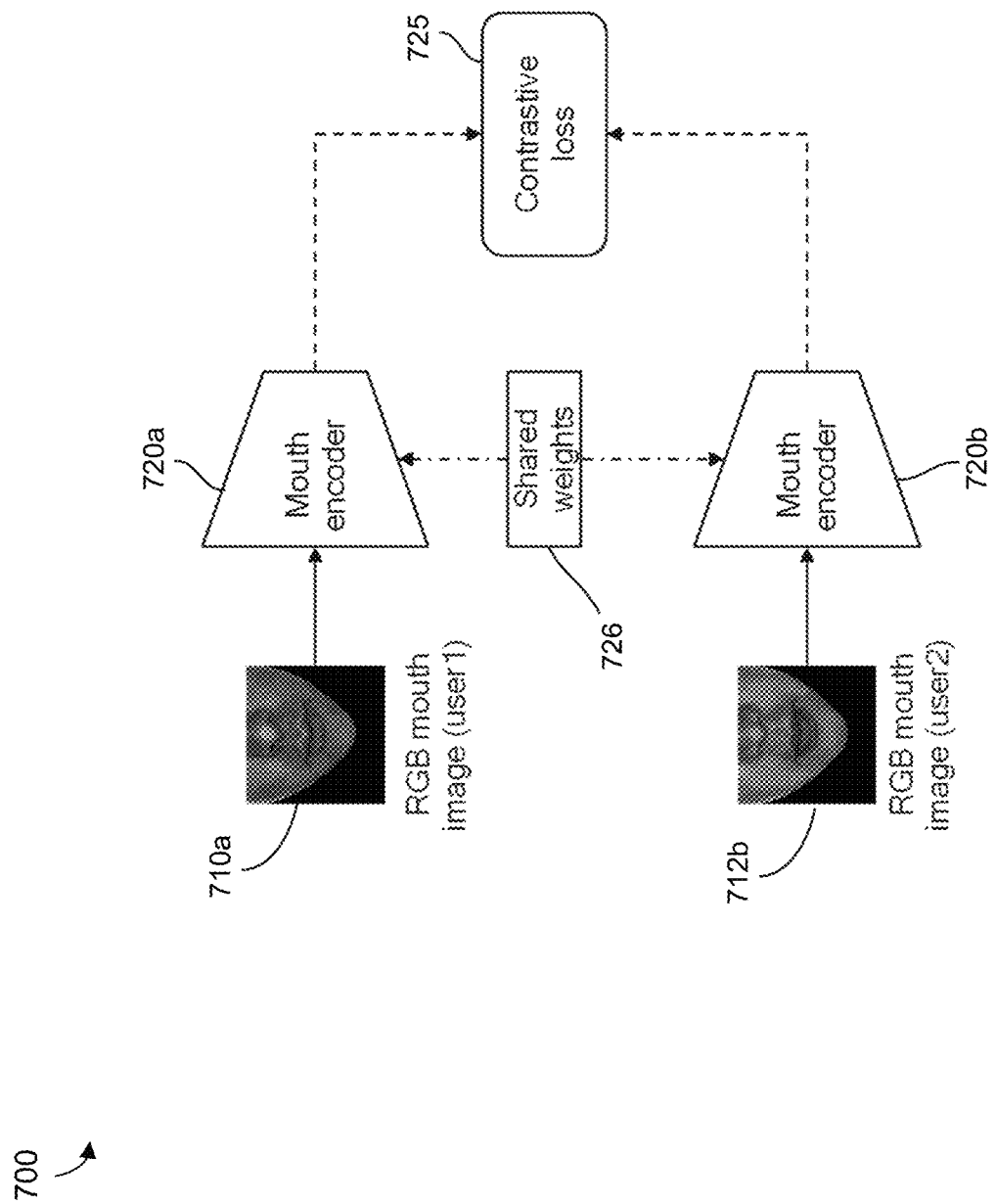
FIG. 7 is a block diagram illustrating an example of a Siamese network that can be trained to determine a user identity match or mismatch based on mouth images, in accordance with some examples.

In another illustrative example, user authentication based on a plurality of partial HMD images can be performed using a Siamese network. For example, FIG. 7 is a diagram illustrating an example training process for training a Siamese network 700 to determine a similarity between a target HMD mouth image 710a and a source HMD mouth image 710b. In some aspects, the target HMD mouth image 710a can be an HMD mouth image that was captured during user enrollment (e.g., in response to prompting the user to perform a specified expression, wherein the enrolled HMD mouth image is enrolled corresponding to the specified expression and the user). The source HMD mouth image 710b can be an HMD mouth image that is captured during an authentication stage, such as while the user is wearing the HMD (e.g., as described above).

In some aspects, the Siamese network 700 can be trained and implemented (e.g., implemented to perform inference for use in user authentication) to use only HMD mouth images. As mentioned previously, HMD images of the eye (e.g., such as those described with respect to FIGS. 5A-6) may only be captured in the IR or NIR domain(s) and cannot typically be obtained in the RGB domain. However, HMD images of the mouth can be captured in the RGB domain, based on the fact that an HMD worn by a user typically will occlude or cover the user's eyes but does not occlude or cover the user's mouth.

In some aspects, the Siamese network 700 can be trained to perform user authentication based on skin texture and color information captured in RGB mouth images (e.g., such as the source and target RGB mouth images 710a, 712b, respectively). Training can be performed for a pair of identical mouth encoders 720a, 720b (e.g., which can be provided as neural networks, neural network encoders, etc., in a manner the same as or similar to that described above with respect to the encoders depicted in FIGS. 5A-6). In one illustrative example, the Siamese network 700 comprising the paired mouth encoders 720a, 720b can be trained in a plurality of training iterations and using a plurality of paired RGB mouth images. For example, the training data pairs of RGB mouth images can include a source RGB mouth image 710a and a target RGB mouth image 712b, which may or may not belong to the same individual. The training data pairs can be labeled with an indication of whether or not the source and target RGB mouth images (e.g., 710a, 712b) belong to the same individual or not. Over a plurality of training iterations, a contrastive loss 725 can be determined between the encoded outputs of the first Siamese mouth encoder 720a (e.g., the source encoder) and the second Siamese mouth encoder 720b (e.g., the target encoder), such that the Siamese network 700 is trained to detect a match or mismatch of identity between the source RGB mouth image 710 and the target RGB mouth image 712b.

Authentication based on the trained Siamese network 700a can be performed to include an enrollment stage that is the same as that described above with respect to FIGS. 5A-6. A set of expression of the user (e.g., neutral, smiling, anger, etc.) can be enrolled by prompting the user to perform the specified expression. The captured RGB mouth data can be provided to the trained Siamese network 700 and fixed as the target (e.g., fixed as the target RGB mouth image and/or fixed as the target for the match/mismatch detection performed by the trained Siamese network 700). In the authentication stage, a user can be prompted to perform one or more expressions that were previously enrolled. HMD mouth images can be captured of the user performing the requested expression for authentication and can be fixed as the source (e.g., fixed as the source RGB mouth image and/or fixed as the source for the match/mismatch detection performed by the trained Siamese network 700). The source-target pair for each expression prompted from the user during authentication can be passed as input to the trained Siamese network 700a (e.g., the RGB mouth image fixed as target can be passed to the target mouth encoder 720b and the RGB mouth image fixed as source can be passed to the source mouth encoder 720a) which can generate as output an indication or determination of either a match (e.g., in which case the user is authenticated) or a mismatch (e.g., in which case the user is not authenticated). In some cases, authentication of the user can be performed based on determining that a Euclidean distance between the source-target pairs of RGB HMD mouth images is less than or equal to a pre-determined threshold.

Figure 8:
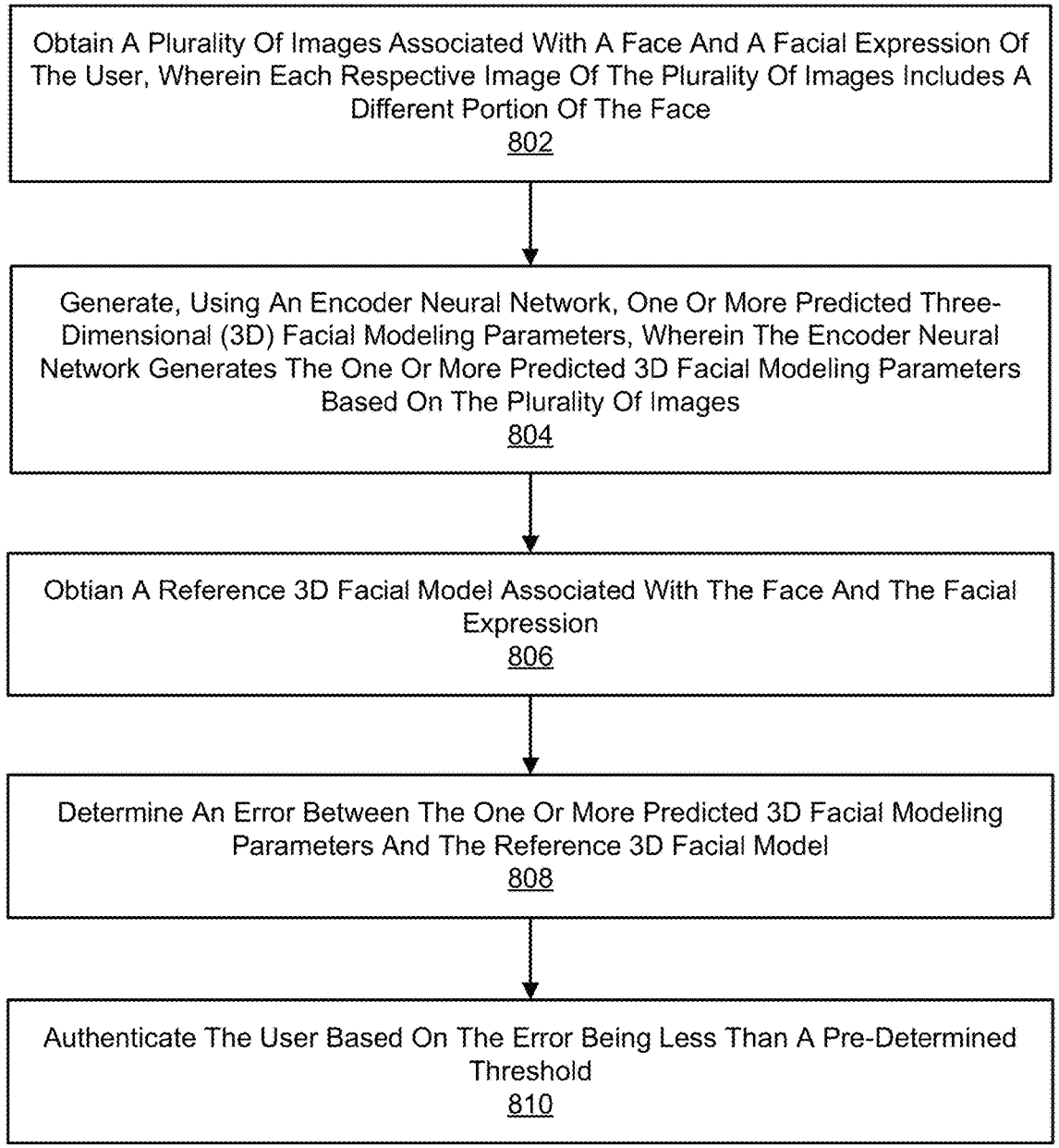
FIG. 8 is a flow diagram illustrating an example of a process for authenticating a user, in accordance with some examples.

FIG. 8 is a flowchart illustrating an example of a process 800 for authenticating a user. Although the example process 800 depicts a particular sequence of operations, the sequence may be altered without departing from the scope of the present disclosure. For example, some of the operations depicted may be performed in parallel or in a different sequence that does not materially affect the function of the process 800. In other examples, different components of an example device or system that implements the process 800 may perform functions at substantially the same time or in a specific sequence.

At block 802, the process 800 includes obtaining a plurality of images associated with a face and a facial expression of the user, wherein each respective image of the plurality of images includes a different portion of the face. For example, the plurality of images can be obtained from a user-facing camera of a head mounted device (HMD), which in some cases may be the same as or similar to the HMD 202 illustrated in FIG. 2. In some examples, the plurality of images may be partial images of the face. For example, the plurality of images can include an image of a left eye (e.g., such as images 204A illustrated in FIG. 2, 302 illustrated in FIG. 3A, 512$b$ illustrated in FIG. 5A, 514$b$ and/or 506$b$ illustrated in FIG. 5B, 612$b$ illustrated in FIG. 6, etc.), an image of a right eye (e.g., such as images 204B illustrated in FIG. 2, 304 illustrated in FIG. 3A, 512$a$ illustrated in FIG. 5A, 514$a$ and/or 506$a$ illustrated in FIG. 5B, 612$a$ illustrated in FIG. 6, etc.), and an image of a mouth (e.g., such as images 204C illustrated in FIG. 2, 306 illustrated in FIG. 3A, 512$c$ illustrated in FIG. 5A, 514$c$ and/or 506$c$ illustrated in FIG. 5B, 612$c$ illustrated in FIG. 6, 710$a$ and/or 712$b$ illustrated in FIG. 7, etc.).

In some examples, obtaining the plurality of images associated with the face and the facial expression of the user can include obtaining a near-infrared (NIR) image of the left eye and an NIR image of the right eye. The image of left eye can be generated based on the NIR image of the left eye, wherein the image of the left eye is a predicted color image of the left eye. In some cases, the image of the right eye can be generated based on the NIR image of the right eye, wherein the image of the right eye is a predicted color image of the right eye.

At block 804, the process 800 includes generating, using an encoder neural network, one or more predicted three-dimensional (3D) facial modeling parameters, wherein the encoder neural network generates the one or more predicted 3D facial modeling parameters based on the plurality of images. For example, the encoder neural network can be the same as or similar to the shape-expression encoder 522 illustrated in FIGS. 5A and 5B, can be the same as or similar to the pose network encoder 620 illustrated in FIG. 6, and/or can be the same as or similar to the mouth encoder networks 720$a$, 720$b$ illustrated in FIG. 7.

In some cases, the encoder neural network can generate one or more predicted 3D facial modeling parameters that are 3D Morphable Model (3DMM) parameters. In some cases, generating the one or more predicted 3D facial modeling parameters includes generating, using the encoder neural network, a plurality of predicted shape coefficients for a 3D facial model and generating, using the encoder neural network, a plurality of predicted expression coefficients for the 3D facial model. For example, the predicted shape coefficients and/or the predicted expression coefficients can be included in the shape and expression coefficients 524 predicted by the shape-expression encoder 522 illustrated in FIG. 5A and FIG. 5B.

In some examples, generating the one or more predicted 3D facial modeling parameters includes generating, using the encoder neural network, predicted camera pose information associated with the plurality of images. For example, the pose network 620 can be used to generate predicted HMD (e.g., camera) pose information 640 illustrated in FIG. 6. In some cases, the predicted camera pose information can be 6 DOF pose information. In some cases, each image included in the plurality of images can be obtained using a respective user-facing camera of a plurality of user-facing cameras of a head mounted device (HMD). The predicted camera pose information can be associated with at least a first user-facing camera included in the plurality of user-facing cameras of the HMD.

At block 806, the process 800 includes obtaining a reference 3D facial model associated with the face and the facial expression. For example, the reference 3D facial model can be generated based on providing one or more enrollment images of the user to the encoder neural network, wherein each enrollment image is associated with the face of the user and the facial expression of the user. In some examples, the reference 3D facial model can include a plurality of reference shape coefficients and a plurality of reference expression coefficients. In some cases, the reference 3D facial model can be generated based on providing one or more enrollment images to the encoder neural network. Each enrollment image of the one or more enrollment images may be associated with the face and the facial expression. The reference 3D model can include one or more enrolled landmarks associated with the face and the facial expression.

At block 808, the process 800 includes determining an error between the one or more predicted 3D facial modeling parameters and the reference 3D facial model. For example, determining the error between the one or more predicted 3D facial modeling parameters and the reference 3D facial model can include determining one or more error values between the plurality of predicted shape coefficients and the plurality of reference shape coefficients. In some cases, determining the error between the one or more predicted 3D facial modeling parameters and the reference 3D facial model can additionally, or alternatively, include determining one or more error values between the plurality of predicted expression coefficients and the plurality of reference expression coefficients.

In some cases, determining the error between the one or more predicted 3D facial modeling parameters and the reference 3D facial model includes generating a predicted 3D facial model using the plurality of predicted shape coefficients, the plurality of predicted expression coefficients, and a mean face component. For example, the mean face component can be a 3DMM mean and basis, such as the 3DMM mean and basis 540 illustrated in FIGS. 5A and 5B. The predicted 3D facial model can be the same as or similar to the predicted 3D mesh 552 illustrated in FIG. 5A and/or the predicted 3D mesh 550 illustrated in FIG. 5B. In some examples, determining the error between the one or more predicted 3D facial modeling parameters and the reference 3D facial model can include determining a mean vertex error between a plurality of vertices included in the predicted 3D facial model and a plurality of vertices included in the reference 3D facial model. For example, the mean vertex error can be the same as or similar to the 2D vertex distance loss 575 illustrated in FIG. 5A.

In some cases, determining the error between the one or more predicted 3D facial modeling parameters and the reference 3D facial model can be based on obtaining camera intrinsic information associated with the plurality of user-facing cameras of the HMD. For example, the camera intrinsic information and the predicted camera pose information (e.g., the HMD pose prediction 640 illustrated in FIG. 6) can be used to project one or more enrolled landmarks from the reference 3D facial model to the plurality of images. In some examples, the one or more error values can be 2D mean landmark error values. In some examples, the one or more landmarks included in the plurality of images can be detected landmarks determined based on providing the plurality of images as input to a two-dimensional (2D) landmark detector, such as the 2D vertex distance loss landmark detector 655 illustrated in FIG. 6.

In some examples, the processes described herein (e.g., process 800 and/or any other process described herein) may be performed by a computing device, apparatus, or system. In one example, the process 800 can be performed by a computing device or system having the computing device architecture 1100 of FIG. 11. The computing device, apparatus, or system can include any suitable device, such as a mobile device (e.g., a mobile phone), a desktop computing device, a tablet computing device, a wearable device (e.g., a VR headset, an AR headset, AR glasses, an extended reality (XR) headset, a network-connected watch or smartwatch, or other wearable device), a server computer, a vehicle or computing system or device of a vehicle, a robotic device, a laptop computer, a smart television, a camera, and/or any other computing device with the resource capabilities to perform the processes described herein, including the process 800 and/or any other process described herein. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 800 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 800 and/or any other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 9:
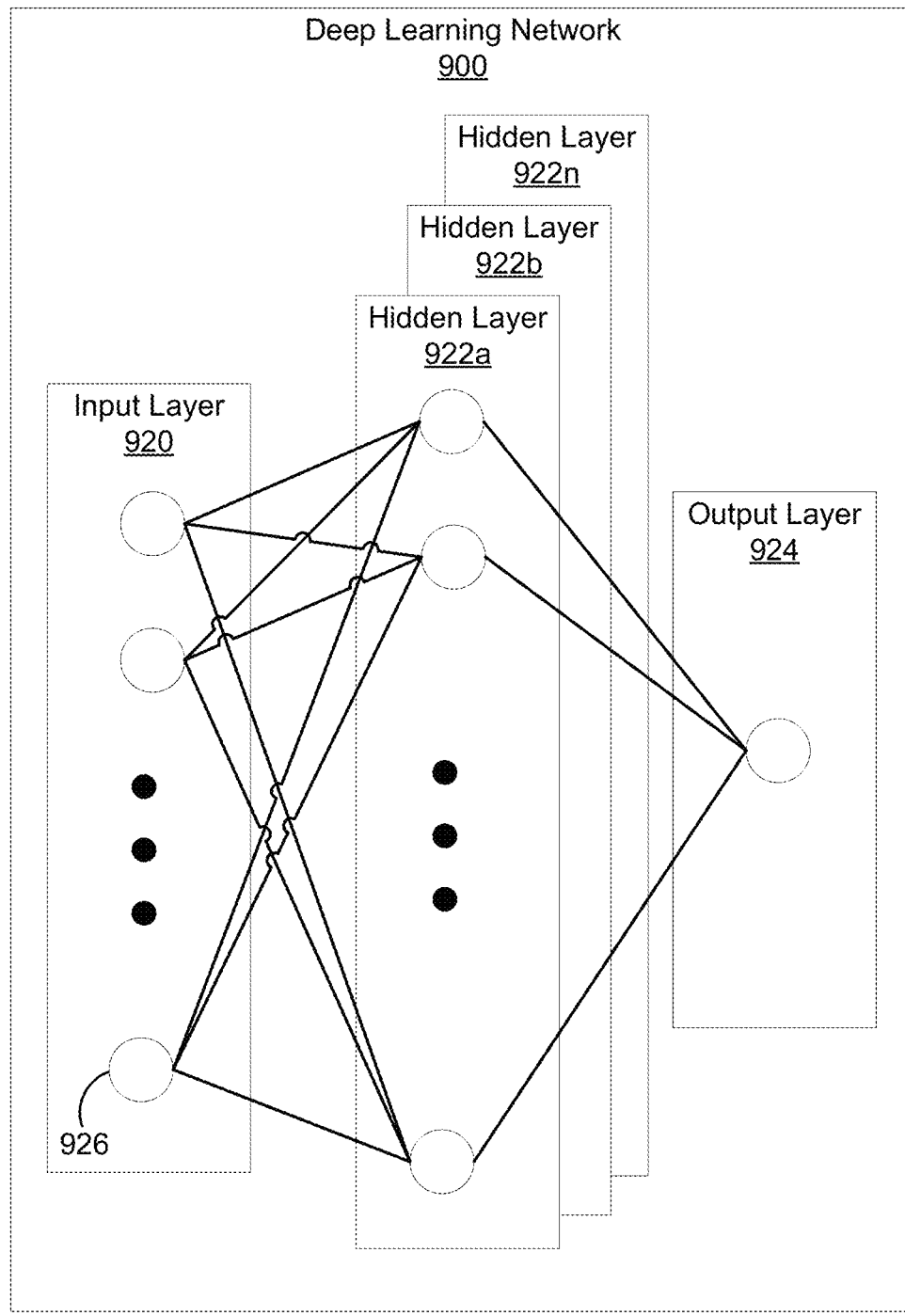
FIG. 9 is a block diagram illustrating an example of a deep learning network, in accordance with some examples.

FIG. 9 is an illustrative example of a deep learning neural network 900 that can be used by a 3D model training system. An input layer 920 includes input data. In one illustrative example, the input layer 920 can include data representing the pixels of an input video frame. The neural network 900 includes multiple hidden layers 922*a*, 922*b*, through 922*n*. The hidden layers 922*a*, 922*b*, through 922*n* include "n" number of hidden layers, where "n" is an integer greater than or equal to one. The number of hidden layers can be made to include as many layers as needed for the given application. The neural network 900 further includes an output layer 924 that provides an output resulting from the processing performed by the hidden layers 922*a*, 922*b*, through 922*n*. In one illustrative example, the output layer 924 can provide a classification for an object in an input video frame. The classification can include a class identifying the type of object (e.g., a person, a dog, a cat, or other object).

The neural network 900 is a multi-layer neural network of interconnected nodes. Each node can represent a piece of information. Information associated with the nodes is shared among the different layers and each layer retains information as information is processed. In some cases, the neural network 900 can include a feed-forward network, in which case there are no feedback connections where outputs of the network are fed back into itself. In some cases, the neural network 900 can include a recurrent neural network, which can have loops that allow information to be carried across nodes while reading in input.

Information can be exchanged between nodes through node-to-node interconnections between the various layers. Nodes of the input layer 920 can activate a set of nodes in the first hidden layer 922*a*. For example, as shown, each of the input nodes of the input layer 920 is connected to each of the nodes of the first hidden layer 922*a*. The nodes of the hidden layers 922*a*, 922*b*, through 922*n* can transform the information of each input node by applying activation functions to the information. The information derived from the transformation can then be passed to and can activate the nodes of the next hidden layer 922*b*, which can perform their own designated functions. Example functions include convolutional, up-sampling, data transformation, and/or any other suitable functions. The output of the hidden layer 922*b* can then activate nodes of the next hidden layer, and so on. The output of the last hidden layer 922*n* can activate one or more nodes of the output layer 924, at which an output is provided. In some cases, while nodes (e.g., node 926) in the neural network 900 are shown as having multiple output lines, a node has a single output and all lines shown as being output from a node represent the same output value.

In some cases, each node or interconnection between nodes can have a weight that is a set of parameters derived from the training of the neural network 900. Once the neural network 900 is trained, it can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 900 to be adaptive to inputs and able to learn as more and more data is processed.

The neural network 900 is pre-trained to process the features from the data in the input layer 920 using the different hidden layers 922a, 922b, through 922n in order to provide the output through the output layer 924. In an example in which the neural network 900 is used to identify objects in images, the neural network 900 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the neural network 900 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 900 is trained well enough so that the weights of the layers are accurately tuned.

For the example of identifying objects in images, the forward pass can include passing a training image through the neural network 900. The weights are initially randomized before the neural network 900 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the neural network 900, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 900 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $E_{total}=\Sigma\frac{1}{2}(\text{target-output})^2$, which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 900 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta\frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The neural network 900 can include any suitable deep network. One example includes a convolutional neural network (CNN), which includes an input layer and an output layer, with multiple hidden layers between the input and out layers. An example of a CNN is described below with respect to FIG. 10. The hidden layers of a CNN include a series of convolutional, nonlinear, pooling (for downsampling), and fully connected layers. The neural network 900 can include any other deep network other than a CNN, such as an autoencoder, a deep belief nets (DBNs), a Recurrent Neural Networks (RNNs), among others.

Figure 10:
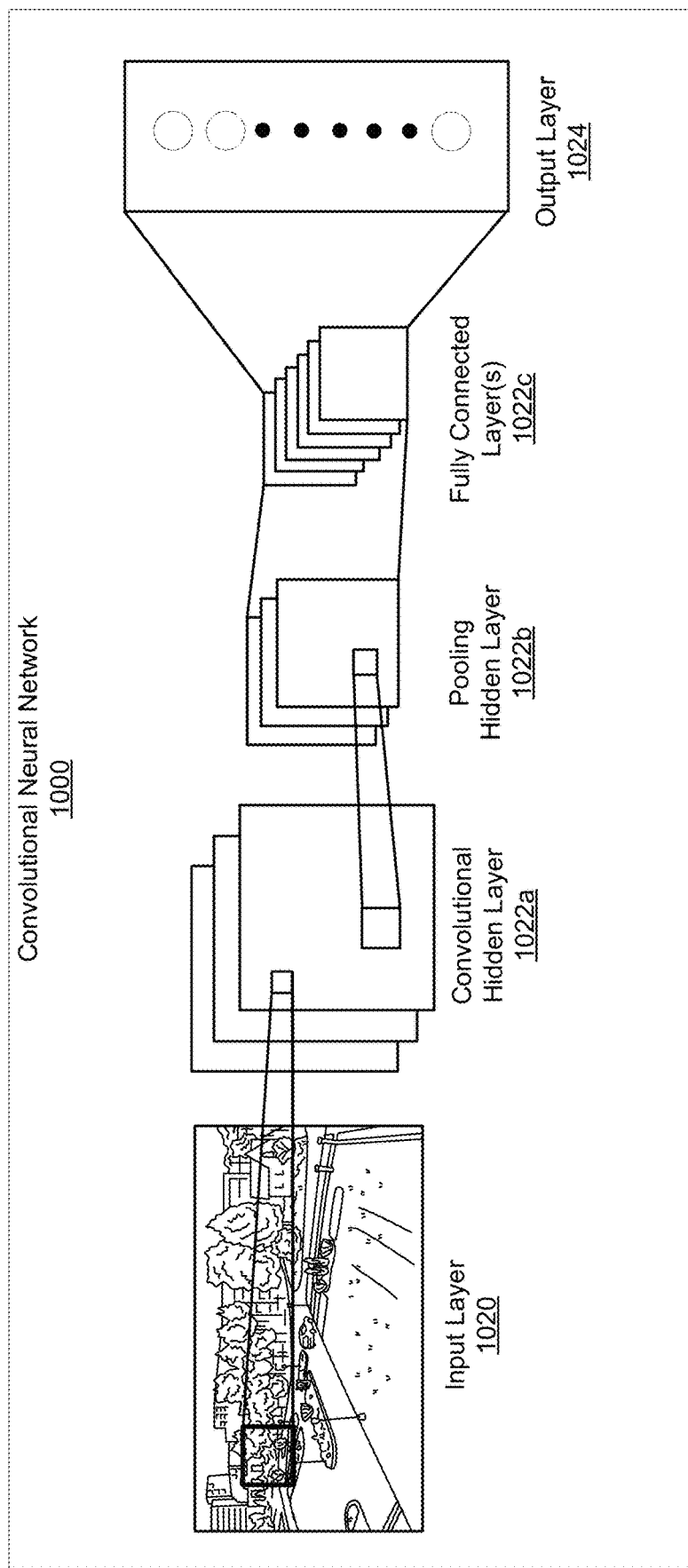
FIG. 10 is a block diagram illustrating an example of a convolutional neural network, in accordance with some examples.

FIG. 10 is an illustrative example of a convolutional neural network 1000 (CNN 1000). The input layer 1020 of the CNN 1000 includes data representing an image. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1022a, an optional non-linear activation layer, a pooling hidden layer 1022b, and fully connected hidden layers 1022c to get an output at the output layer 1024. While only one of each hidden layer is shown in FIG. 10, one of ordinary skill will appreciate that multiple convolutional hidden layers, non-linear layers, pooling hidden layers, and/or fully connected layers can be included in the CNN 1000. As previously described, the output can indicate a single class of an object or can include a probability of classes that best describe the object in the image.

The first layer of the CNN 1000 is the convolutional hidden layer 1022a. The convolutional hidden layer 1022a analyzes the image data of the input layer 1020. Each node of the convolutional hidden layer 1022a is connected to a region of nodes (pixels) of the input image called a receptive field. The convolutional hidden layer 1022a can be considered as one or more filters (each filter corresponding to a different activation or feature map), with each convolutional iteration of a filter being a node or neuron of the convolutional hidden layer 1022a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1022a. Each connection between a node and a receptive field for that node learns a weight and, in some cases, an overall bias such that each node learns to analyze its particular local receptive field in the input image. Each node of the hidden layer 1022a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 1022a is due to each node of the convolutional layer being applied to its corresponding receptive field. For example, a filter of the convolutional hidden layer 1022a can begin in the top-left corner of the input image array and can convolve around the input image. As noted above, each convolutional iteration of the filter can be considered a node or neuron of the convolutional hidden layer 1022a. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1022a.

For example, a filter can be moved by a step amount to the next receptive field. The step amount can be set to 1 or other suitable amount. For example, if the step amount is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1022a.

The mapping from the input layer to the convolutional hidden layer 1022a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a step amount of 1) of a 28×28 input image. The convolutional hidden layer 1022a can include several activation maps in order to identify multiple features in an image. The example shown in FIG. 10 includes three activation maps. Using three activation maps, the convolutional hidden layer 1022a can detect three different kinds of features, with each feature being detectable across the entire image.

In some examples, a non-linear hidden layer can be applied after the convolutional hidden layer 1022a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the CNN 1000 without affecting the receptive fields of the convolutional hidden layer 1022a.

The pooling hidden layer 1022b can be applied after the convolutional hidden layer 1022a (and after the non-linear hidden layer when used). The pooling hidden layer 1022b is used to simplify the information in the output from the convolutional hidden layer 1022a. For example, the pooling hidden layer 1022b can take each activation map output from the convolutional hidden layer 1022a and generates a condensed activation map (or feature map) using a pooling function. Max-pooling is one example of a function performed by a pooling hidden layer. Other forms of pooling functions be used by the pooling hidden layer 1022a, such as average pooling, L2-norm pooling, or other suitable pooling functions. A pooling function (e.g., a max-pooling filter, an L2-norm filter, or other suitable pooling filter) is applied to each activation map included in the convolutional hidden layer 1022a. In the example shown in FIG. 10, three pooling filters are used for the three activation maps in the convolutional hidden layer 1022a.

In some examples, max-pooling can be used by applying a max-pooling filter (e.g., having a size of 2×2) with a step amount (e.g., equal to a dimension of the filter, such as a step amount of 2) to an activation map output from the convolutional hidden layer 1022a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1022a having a dimension of 24×24 nodes, the output from the pooling hidden layer 1022b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1000.

The final layer of connections in the network is a fully-connected layer that connects every node from the pooling hidden layer 1022b to every one of the output nodes in the output layer 1024. Using the example above, the input layer includes 28×28 nodes encoding the pixel intensities of the input image, the convolutional hidden layer 1022a includes 3×24×24 hidden feature nodes based on application of a 5×5 local receptive field (for the filters) to three activation maps, and the pooling layer 1022b includes a layer of 3×12×12 hidden feature nodes based on application of max-pooling filter to 2×2 regions across each of the three feature maps.

Extending this example, the output layer 1024 can include ten output nodes. In such an example, every node of the 3×12×12 pooling hidden layer 1022b is connected to every node of the output layer 1024.

The fully connected layer 1022c can obtain the output of the previous pooling layer 1022b (which should represent the activation maps of high-level features) and determines the features that most correlate to a particular class. For example, the fully connected layer 1022c layer can determine the high-level features that most strongly correlate to a particular class, and can include weights (nodes) for the high-level features. A product can be computed between the weights of the fully connected layer 1022c and the pooling hidden layer 1022b to obtain probabilities for the different classes. For example, if the CNN 1000 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1024 can include an M-dimensional vector (in the prior example, M=10), where M can include the number of classes that the program has to choose from when classifying the object in the image. Other example outputs can also be provided. Each number in the N-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

Figure 11:
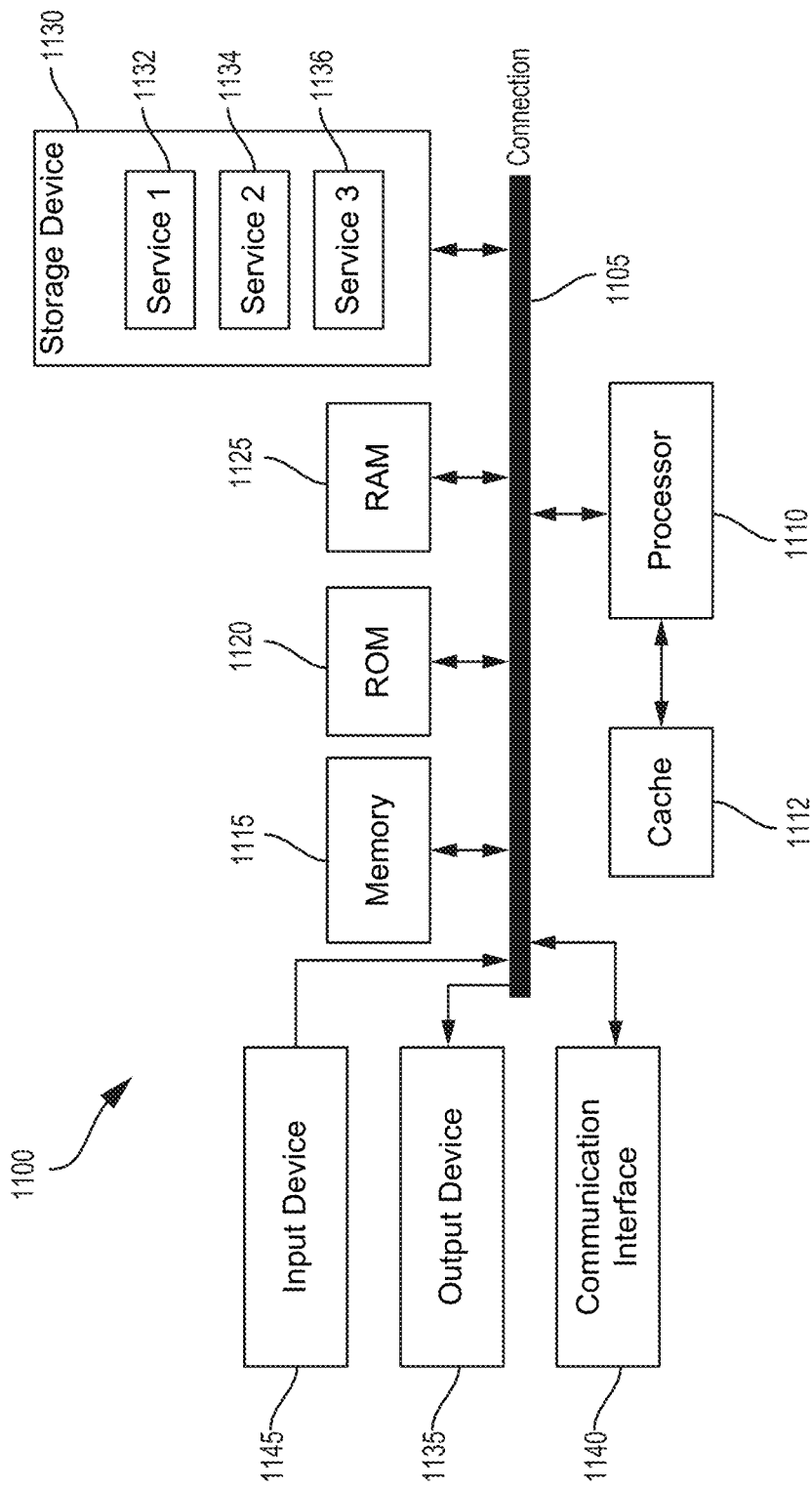
FIG. 11 is a block diagram illustrating an example of a computing system for implementing certain aspects described herein.

FIG. 11 is a diagram illustrating an example of a system for implementing certain aspects of the present technology. In particular, FIG. 11 illustrates an example of computing system 1100, which can be for example any computing device making up internal computing system, a remote computing system, a camera, or any component thereof in which the components of the system are in communication with each other using connection 1105. Connection 1105 can be a physical connection using a bus, or a direct connection into processor 1110, such as in a chipset architecture. Connection 1105 can also be a virtual connection, networked connection, or logical connection.

In some aspects, computing system 1100 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1100 includes at least one processing unit (CPU or processor) 1110 and connection 1105 that couples various system components including system memory 1115, such as read-only memory (ROM) 1120 and random access memory (RAM) 1125 to processor 1110. Computing system 1100 can include a cache 1112 of high-speed memory connected directly with, in close proximity to, or integrated as part of processor 1110.

Processor 1110 can include any general-purpose processor and a hardware service or software service, such as services 1132, 1134, and 1136 stored in storage device 1130, configured to control processor 1110 as well as a special-purpose processor where software instructions are incorporated into the actual processor design. Processor 1110 may essentially be a completely self-contained computing system, containing multiple cores or processors, a bus, memory controller, cache, etc. A multi-core processor may be symmetric or asymmetric.

To enable user interaction, computing system 1100 includes an input device 1145, which can represent any number of input mechanisms, such as a microphone for speech, a touch-sensitive screen for gesture or graphical input, keyboard, mouse, motion input, speech, etc. Computing system 1100 can also include output device 1135, which can be one or more of a number of output mechanisms. In some instances, multimodal systems can enable a user to provide multiple types of input/output to communicate with computing system 1100. Computing system 1100 can include communications interface 1140, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1140 may also include one or more Global Navigation Satellite System (GNSS) receivers or transceivers that are used to determine a location of the computing system 1100 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1130 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1130 can include software services, servers, services, etc., that when the code that defines such software is executed by the processor 1110, it causes the system to perform a function. In some aspects, a hardware service that performs a particular function can include the software component stored in a computer-readable medium in connection with the necessary hardware components, such as processor 1110, connection 1105, output device 1135, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, mobile phones (e.g., smartphones or other types of mobile phones), tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

Aspect 1: A method of authenticating a user, the method comprising: obtaining a plurality of images associated with a face and a facial expression of the user, wherein each respective image of the plurality of images includes a different portion of the face; generating, using an encoder neural network, one or more predicted three-dimensional (3D) facial modeling parameters, wherein the encoder neural network generates the one or more predicted 3D facial modeling parameters based on the plurality of images; obtaining a reference 3D facial model associated with the face and the facial expression; determining an error between the one or more predicted 3D facial modeling parameters and the reference 3D facial model; and authenticating the user based on the error being less than a pre-determined authentication threshold.

Aspect 2: The method of Aspect 1, wherein the plurality of images are obtained from a user-facing camera of a head mounted device (HMD).

Aspect 3: The method of any of Aspects 1 to 2, wherein the plurality of images are partial images of the face.

Aspect 4: The method of any of Aspects 1 to 3, wherein the plurality of images includes an image of a left eye, an image of a right eye, and an image of a mouth.

Aspect 5: The method of Aspect 4, wherein obtaining the plurality of images comprises: obtaining a near-infrared (NIR) image of the left eye and an NIR image of the right eye; generating the image of the left eye based on the NIR image of the left eye, wherein the image of the left eye is a predicted color image of the left eye; and generating the image of the right eye based on the NIR image of the right eye, wherein the image of the right eye is a predicted color image of the right eye.

Aspect 6: The method of any of Aspects 1 to 5, wherein the one or more predicted 3D facial modeling parameters are 3D Morphable Model (3DMM) parameters.

Aspect 7: The method of any of Aspects 1 to 6, wherein generating the one or more predicted 3D facial modeling parameters comprises: generating, using the encoder neural network, a plurality of predicted shape coefficients for a 3D facial model; and generating, using the encoder neural network, a plurality of predicted expression coefficients for the 3D facial model.

Aspect 8: The method of Aspect 7, wherein: the reference 3D facial model is generated based on providing one or more enrollment images to the encoder neural network; and each enrollment image of the one or more enrollment images is associated with the face and the facial expression.

Aspect 9: The method of Aspect 8, wherein the reference 3D facial model includes a plurality of reference shape coefficients and a plurality of reference expression coefficients.

Aspect 10: The method of Aspect 9, wherein determining the error between the one or more predicted 3D facial modeling parameters and the reference 3D facial model comprises: determining one or more error values between the plurality of predicted shape coefficients and the plurality of reference shape coefficients; and determining one or more error values between the plurality of predicted expression coefficients and the plurality of reference expression coefficients.

Aspect 11: The method of any of Aspects 8 to 10, wherein determining the error between the one or more predicted 3D facial modeling parameters and the reference 3D facial model comprises: generating a predicted 3D facial model using the plurality of predicted shape coefficients, the plurality of predicted expression coefficients, and a mean face component; and determining a mean vertex error between a plurality of vertices included in the predicted 3D facial model and a plurality of vertices included in the reference 3D facial model.

Aspect 12: The method of any of Aspects 1 to 11, wherein generating the one or more predicted 3D facial modeling parameters comprises: generating, using the encoder neural network, predicted camera pose information associated with the plurality of images.

Aspect 13: The method of Aspect 12, wherein: each image included in the plurality of images is obtained using a respective user-facing camera of a plurality of user-facing cameras of a head mounted device (HMD); and the predicted camera pose information is associated with at least a first user-facing camera included in the plurality of user-facing cameras of the HMD.

Aspect 14: The method of Aspect 13, wherein: the reference 3D facial model is generated based on providing one or more enrollment images to the encoder neural network, each enrollment image of the one or more enrollment images associated with the face and the facial expression; and the reference 3D facial model includes one or more enrolled landmarks associated with the face and the facial expression.

Aspect 15: The method of Aspect 14, wherein determining the error between the one or more predicted 3D facial modeling parameters and the reference 3D facial model comprises: obtaining camera intrinsic information associated with the plurality of user-facing cameras of the HMD; projecting the one or more enrolled landmarks from the reference 3D facial model to the plurality of images, based on the predicted camera pose information and the camera intrinsic information; and determining one or more error values between the projected enrolled landmarks and one or more landmarks included in the one or more images.

Aspect 16: The method of Aspect 15, wherein the one or more error values are two-dimensional (2D) mean landmark error values.

Aspect 17: The method of Aspect 16, wherein the one or more landmarks included in the plurality of images are detected landmarks determined based on providing the plurality of images as input to a two-dimensional (2D) landmark detector.

Aspect 18: An apparatus comprising: at least one memory; and at least one processor coupled to the at least one memory and configured to: obtain a plurality of images associated with a face and a facial expression of the user, wherein each respective image of the plurality of images includes a different portion of the face; generate, using an encoder neural network, one or more predicted three-dimensional (3D) facial modeling parameters, wherein the encoder neural network generates the one or more predicted 3D facial modeling parameters based on the plurality of images; obtain a reference 3D facial model associated with the face and the facial expression; determine an error between the one or more predicted 3D facial modeling parameters and the reference 3D facial model; and authenticate the user based on the error being less than a pre-determined authentication threshold.

Aspect 19: The apparatus of Aspect 18, wherein the plurality of images are obtained from a user-facing camera of a head mounted device (HMD) and include an image of a left eye, an image of a right eye, and an image of a mouth.

Aspect 20: The apparatus of Aspect 19, wherein obtaining the plurality of images comprises: obtaining a near-infrared (NIR) image of the left eye and an NIR image of the right eye; generating the image of the left eye based on the NIR image of the left eye, wherein the image of the left eye is a predicted color image of the left eye; and generating the image of the right eye based on the NIR image of the right eye, wherein the image of the right eye is a predicted color image of the right eye.

Aspect 21: The apparatus of any of Aspects 18 to 20, wherein the one or more predicted 3D facial modeling parameters are 3D Morphable Model (3DMM) parameters.

Aspect 22: The apparatus of any of Aspects 18 to 21, wherein generating the one or more predicted 3D facial modeling parameters comprises: generating, using the encoder neural network, a plurality of predicted shape coefficients for a 3D facial model; and generating, using the encoder neural network, a plurality of predicted expression coefficients for the 3D facial model.

Aspect 23: The apparatus of Aspect 22, wherein: the reference 3D facial model is generated based on providing one or more enrollment images to the encoder neural network; and each enrollment image of the one or more enrollment images is associated with the face and the facial expression.

Aspect 24: The apparatus of Aspect 23, wherein the reference 3D facial model includes a plurality of reference shape coefficients and a plurality of reference expression coefficients.

Aspect 25: The apparatus of Aspect 24, wherein determining the error between the one or more predicted 3D facial modeling parameters and the reference 3D facial model comprises: determining one or more error values between the plurality of predicted shape coefficients and the plurality of reference shape coefficients; and determining one or more error values between the plurality of predicted expression coefficients and the plurality of reference expression coefficients.

Aspect 26: The apparatus of any of Aspects 23 to 25, wherein determining the error between the one or more predicted 3D facial modeling parameters and the reference 3D facial model comprises: generating a predicted 3D facial model using the plurality of predicted shape coefficients, the plurality of predicted expression coefficients, and a mean face component; and determining a mean vertex error between a plurality of vertices included in the predicted 3D facial model and a plurality of vertices included in the reference 3D facial model.

Aspect 27: The apparatus of any of Aspects 18 to 26, wherein generating the one or more predicted 3D facial modeling parameters comprises: generating, using the encoder neural network, predicted camera pose information associated with the plurality of images.

Aspect 28: The apparatus of Aspect 27, wherein: each image included in the plurality of images is obtained using a respective user-facing camera of a plurality of user-facing cameras of a head mounted device (HMD); and the predicted camera pose information is associated with at least a first user-facing camera included in the plurality of user-facing cameras of the HMD.

Aspect 29: The apparatus of Aspect 28, wherein: the reference 3D facial model is generated based on providing one or more enrollment images to the encoder neural network, each enrollment image of the one or more enrollment images associated with the face and the facial expression; and the reference 3D facial model includes one or more enrolled landmarks associated with the face and the facial expression.

Aspect 30: The apparatus of Aspect 29, wherein determining the error between the one or more predicted 3D facial modeling parameters and the reference 3D facial model comprises: obtaining camera intrinsic information associated with the plurality of user-facing cameras of the HMD; projecting the one or more enrolled landmarks from the reference 3D facial model to the plurality of images, based on the predicted camera pose information and the camera intrinsic information; and determining one or more error values between the projected enrolled landmarks and one or more landmarks included in the one or more images.

Aspect 31: The apparatus of Aspect 30, wherein: the one or more error values are two-dimensional (2D) mean landmark error values.

Aspect 32: The apparatus of Aspect 31, wherein the one or more landmarks included in the plurality of images are detected landmarks determined based on providing the plurality of images as input to a two-dimensional (2D) landmark detector.

Aspect 33: An apparatus comprising: at least one memory; and at least one processor coupled to the at least one memory, wherein the at least one processor is configured to perform operations in accordance with any one of Aspects 1 to 32

Aspect 34: An apparatus comprising means for performing operations in accordance with any one of Aspects 1 to 32

Aspect 35: A non-transitory computer-readable medium having stored thereon instructions that, when executed by one or more processors, cause the one or more processors to perform operations according to any one of Aspects 1 to 32

What is claimed is:

1. A method of authenticating a user, the method comprising:
   obtaining a plurality of images associated with a face and a facial expression of the user, wherein each respective image of the plurality of images includes a different portion of the face;
   generating, using an encoder neural network, one or more predicted three-dimensional (3D) facial modeling parameters, wherein the encoder neural network generates the one or more predicted 3D facial modeling parameters based on the plurality of images;
   obtaining a reference 3D facial model associated with the face and an enrolled facial expression of the user, wherein the reference 3D facial model comprises a 3D mesh generated from a plurality of enrollment images of the face of the user with the enrolled facial expression;
   determining an error between predicted expression coefficients included in the one or more predicted 3D facial modeling parameters and reference expression coefficients determined for the reference 3D facial model, wherein the predicted expression coefficients correspond to the facial expression and the reference expression coefficients correspond to the enrolled facial expression; and
   authenticating the user based on the error being less than a pre-determined authentication threshold.

2. The method of claim 1, wherein the plurality of images are obtained from a user-facing camera of a head mounted device (HMD).

3. The method of claim 1, wherein the plurality of images are partial images of the face.

4. The method of claim 1, wherein the plurality of images includes an image of a left eye, an image of a right eye, and an image of a mouth.

5. The method of claim 4, wherein obtaining the plurality of images comprises:
   obtaining a near-infrared (NIR) image of the left eye and an NIR image of the right eye;
   generating the image of the left eye based on the NIR image of the left eye, wherein the image of the left eye is a predicted color image of the left eye; and
   generating the image of the right eye based on the NIR image of the right eye, wherein the image of the right eye is a predicted color image of the right eye.

6. The method of claim 1, wherein the one or more predicted 3D facial modeling parameters are 3D Morphable Model (3DMM) parameters.

7. The method of claim 1, wherein generating the one or more predicted 3D facial modeling parameters comprises:
   generating, using the encoder neural network, a plurality of predicted shape coefficients for a 3D facial model; and generating, using the encoder neural network, a plurality of predicted expression coefficients for the 3D facial model.

8. The method of claim 7, wherein:
the reference 3D facial model is generated based on providing one or more enrollment images of the plurality of enrollment images to the encoder neural network; and
each enrollment image of the one or more enrollment images is associated with the face of the user and the enrolled facial expression of the user.

9. The method of claim 8, wherein the reference 3D facial model includes a plurality of reference shape coefficients and a plurality of reference expression coefficients.

10. The method of claim 9, wherein determining the error between the one or more predicted 3D facial modeling parameters and the reference 3D facial model comprises:
determining one or more error values between the plurality of predicted shape coefficients and the plurality of reference shape coefficients, wherein the plurality of predicted shape coefficients correspond to the facial expression and the plurality of reference shape coefficients correspond to the enrolled facial expression; and
determining one or more error values between the plurality of predicted expression coefficients and the plurality of reference expression coefficients.

11. The method of claim 8, wherein determining the error between the one or more predicted 3D facial modeling parameters and the reference 3D facial model comprises:
generating a predicted 3D facial model using the plurality of predicted shape coefficients, the plurality of predicted expression coefficients, and a mean face component; and
determining a mean vertex error between a plurality of vertices included in the predicted 3D facial model and a plurality of vertices included in the reference 3D facial model.

12. The method of claim 1, wherein generating the one or more predicted 3D facial modeling parameters comprises:
generating, using the encoder neural network, predicted camera pose information associated with the plurality of images.

13. The method of claim 12, wherein:
each image included in the plurality of images is obtained using a respective user-facing camera of a plurality of user-facing cameras of a head mounted device (HMD); and
the predicted camera pose information is associated with at least a first user-facing camera included in the plurality of user-facing cameras of the HMD.

14. The method of claim 13, wherein:
the reference 3D facial model is generated based on providing one or more enrollment images of the plurality of enrollment images to the encoder neural network, each enrollment image of the one or more enrollment images associated with the face of the user and the enrolled facial expression of the user; and
the reference 3D facial model includes one or more enrolled landmarks associated with the face and the enrolled facial expression.

15. The method of claim 14, wherein determining the error between the one or more predicted 3D facial modeling parameters and the reference 3D facial model comprises:
obtaining camera intrinsic information associated with the plurality of user-facing cameras of the HMD;
projecting the one or more enrolled landmarks from the reference 3D facial model to the plurality of images, based on the predicted camera pose information and the camera intrinsic information; and
determining one or more error values between the projected enrolled landmarks and one or more landmarks included in the one or more images.

16. The method of claim 15, wherein the one or more error values are two-dimensional (2D) mean landmark error values.

17. The method of claim 16, wherein the one or more landmarks included in the plurality of images are detected landmarks determined based on providing the plurality of images as input to a two-dimensional (2D) landmark detector.

18. An apparatus comprising:
at least one memory; and
at least one processor coupled to the at least one memory and configured to:
obtain a plurality of images associated with a face and a facial expression of a user, wherein each respective image of the plurality of images includes a different portion of the face;
generate, using an encoder neural network, one or more predicted three-dimensional (3D) facial modeling parameters, wherein the encoder neural network generates the one or more predicted 3D facial modeling parameters based on the plurality of images;
obtain a reference 3D facial model associated with the face and an enrolled facial expression of the user, wherein the reference 3D facial model comprises a 3D mesh generated from a plurality of enrollment images of the face of the user with the enrolled facial expression;
determine an error between predicted expression coefficients included in the one or more predicted 3D facial modeling parameters and reference expression coefficients determined for the reference 3D facial model, wherein the predicted expression coefficients correspond to the facial expression and the reference expression coefficients correspond to the enrolled facial expression; and
authenticate the user based on the error being less than a pre-determined authentication threshold.

19. The apparatus of claim 18, wherein the plurality of images are obtained from a user-facing camera of a head mounted device (HMD) and include an image of a left eye, an image of a right eye, and an image of a mouth.

20. The apparatus of claim 19, wherein obtaining the plurality of images comprises:
obtaining a near-infrared (NIR) image of the left eye and an NIR image of the right eye;
generating the image of the left eye based on the NIR image of the left eye, wherein the image of the left eye is a predicted color image of the left eye; and
generating the image of the right eye based on the NIR image of the right eye, wherein the image of the right eye is a predicted color image of the right eye.

21. The apparatus of claim 18, wherein the one or more predicted 3D facial modeling parameters are 3D Morphable Model (3DMM) parameters.

22. The apparatus of claim 18, wherein generating the one or more predicted 3D facial modeling parameters comprises:
generating, using the encoder neural network, a plurality of predicted shape coefficients for a 3D facial model; and
generating, using the encoder neural network, a plurality of predicted expression coefficients for the 3D facial model.

23. The apparatus of claim 22, wherein:
the reference 3D facial model is generated based on providing one or more enrollment images of the plurality of enrollment images to the encoder neural network; and
each enrollment image of the one or more enrollment images is associated with the face of the user and the enrolled facial expression of the user.

24. The apparatus of claim 23, wherein the reference 3D facial model includes a plurality of reference shape coefficients and a plurality of reference expression coefficients.

25. The apparatus of claim 24, wherein determining the error between the one or more predicted 3D facial modeling parameters and the reference 3D facial model comprises:
determining one or more error values between the plurality of predicted shape coefficients and the plurality of reference shape coefficients, wherein the plurality of predicted shape coefficients correspond to the facial expression and the plurality of reference shape coefficients correspond to the enrolled facial expression; and
determining one or more error values between the plurality of predicted expression coefficients and the plurality of reference expression coefficients.

26. The apparatus of claim 23, wherein determining the error between the one or more predicted 3D facial modeling parameters and the reference 3D facial model comprises:
generating a predicted 3D facial model using the plurality of predicted shape coefficients, the plurality of predicted expression coefficients, and a mean face component; and
determining a mean vertex error between a plurality of vertices included in the predicted 3D facial model and a plurality of vertices included in the reference 3D facial model.

27. The apparatus of claim 18, wherein generating the one or more predicted 3D facial modeling parameters comprises:
generating, using the encoder neural network, predicted camera pose information associated with the plurality of images.

28. The apparatus of claim 27, wherein:
each image included in the plurality of images is obtained using a respective user-facing camera of a plurality of user-facing cameras of a head mounted device (HMD); and
the predicted camera pose information is associated with at least a first user-facing camera included in the plurality of user-facing cameras of the HMD.

29. The apparatus of claim 28, wherein:
the reference 3D facial model is generated based on providing one or more enrollment images of the plurality of enrollment images to the encoder neural network, each enrollment image of the one or more enrollment images associated with the face of the user and the enrolled facial expression of the user; and
the reference 3D facial model includes one or more enrolled landmarks associated with the face and the enrolled facial expression.

30. The apparatus of claim 29, wherein determining the error between the one or more predicted 3D facial modeling parameters and the reference 3D facial model comprises:
obtaining camera intrinsic information associated with the plurality of user-facing cameras of the HMD;
projecting the one or more enrolled landmarks from the reference 3D facial model to the plurality of images, based on the predicted camera pose information and the camera intrinsic information; and
determining one or more error values between the projected enrolled landmarks and one or more landmarks included in the one or more images.

* * * * *